US007877313B2

(12) United States Patent
Singh

(10) Patent No.: US 7,877,313 B2
(45) Date of Patent: Jan. 25, 2011

(54) METHOD AND SYSTEM FOR A FAILURE RECOVERY FRAMEWORK FOR INTERFACING WITH NETWORK-BASED AUCTIONS

(75) Inventor: Narinder Singh, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1375 days.

(21) Appl. No.: 11/026,146

(22) Filed: Jan. 3, 2005

(65) Prior Publication Data

US 2006/0004649 A1      Jan. 5, 2006

Related U.S. Application Data

(60) Provisional application No. 60/629,640, filed on Nov. 19, 2004, provisional application No. 60/565,198, filed on Apr. 19, 2004, provisional application No. 60/562,838, filed on Apr. 16, 2004.

(51) Int. Cl.
  G06Q 40/00    (2006.01)
  G06F 17/30    (2006.01)
(52) U.S. Cl. .............................. 705/37; 707/1
(58) Field of Classification Search .............. 705/35–42
  See application file for complete search history.

(56) References Cited

U.S. PATENT DOCUMENTS

| 5,101,353 | A | 3/1992 | Lupien et al. |
|---|---|---|---|
| 5,774,553 | A | 6/1998 | Rosen |
| 5,774,873 | A | 6/1998 | Berent et al. |
| 5,835,896 | A | 11/1998 | Fisher et al. |
| 5,890,138 | A | 3/1999 | Godin et al. |
| 6,047,268 | A | 4/2000 | Bartoli et al. |
| 6,058,416 | A | 5/2000 | Mukherjee et al. |
| 6,076,074 | A | 6/2000 | Cotton et al. |
| 6,266,652 | B1 | 7/2001 | Godin et al. |
| 6,285,989 | B1 | 9/2001 | Shoham |
| 6,304,858 | B1 | 10/2001 | Mosler et al. |
| 6,370,547 | B1 | 4/2002 | Eftink |
| 6,388,183 | B1 | 5/2002 | Leh |
| 6,408,282 | B1 | 6/2002 | Buist |
| 6,415,270 | B1 * | 7/2002 | Rackson et al. ............ 705/36 R |
| 6,415,320 | B1 | 7/2002 | Hess et al. |
| 6,442,258 | B1 * | 8/2002 | Mashinsky ............. 379/114.02 |
| 6,442,558 | B1 * | 8/2002 | Brown et al. ................. 717/151 |
| 6,510,216 | B1 | 1/2003 | Burr et al. |
| 6,609,108 | B1 | 8/2003 | Pulliam et al. |
| 6,745,350 | B1 * | 6/2004 | Cline et al. .................... 714/49 |
| 6,792,399 | B1 | 9/2004 | Phillips et al. |
| 6,868,525 | B1 | 3/2005 | Szabo |

(Continued)

OTHER PUBLICATIONS

I Pivot delivers new internet traffic appliances that eliminate error messages and optimize performance of Web Portals and Heavily Trafficked Content Sites, Business Wire: May 10, 1999 p. 1.*
Huxmeier, Daniel, E.M, "A framework for the sustainability of e-marketplaces", Business Process Management Journal, v. 10n3, pp. 277-290, 2004.*
"Novantus CRM software propels success of first online auction bonding programs; Novantus deploys CRM platform for buySafe in Record Time", Business Wire: New York: Feb. 23, 2004, p. 1.*

(Continued)

Primary Examiner—Ella Colbert
Assistant Examiner—Mohammad Z Shaikh
(74) Attorney, Agent, or Firm—Kenyon & Kenyon LLP

(57) ABSTRACT

A method of failure recovery is provided that includes providing an automatic failure recovery transaction in an auction application interacting with a network-based auction service. The network-based auction service has a forward-only process that is adapted to prevent roll-back to a process state at a time of a failure. If the failure occurs within the forward-only process, the method includes automatically conducting a roll-back to a beginning of the forward-only process by the auction application. A computer readable medium is provided that includes instructions adapted to execute a method for failure recovery.

16 Claims, 18 Drawing Sheets

U.S. PATENT DOCUMENTS

| | | |
|---|---|---|
| 6,871,190 B1 | 3/2005 | Seymour et al. |
| 6,971,105 B1 | 11/2005 | Weber et al. |
| 6,983,395 B2 * | 1/2006 | Chen et al. .................. 714/4 |
| 7,047,210 B1 | 5/2006 | Srinivasan |
| 7,107,227 B1 | 9/2006 | Bezos et al. |
| 7,110,967 B1 | 9/2006 | Espenes et al. |
| 7,136,903 B1 | 11/2006 | Phillips et al. |
| 7,149,720 B2 | 12/2006 | Shepherd |
| 7,158,944 B1 | 1/2007 | Settle, III |
| 7,191,147 B2 | 3/2007 | Heene et al. |
| 7,209,895 B2 | 4/2007 | Kundtz et al. |
| 7,216,103 B2 | 5/2007 | Friedland et al. |
| 7,228,287 B1 | 6/2007 | Samson et al. |
| 7,237,717 B1 | 7/2007 | Rao et al. |
| 7,249,061 B1 * | 7/2007 | Suzuki ................ 705/26 |
| 7,263,498 B1 | 8/2007 | Van Horn et al. |
| 7,289,967 B1 | 10/2007 | Brader-Araje et al. |
| 7,310,610 B2 | 12/2007 | Fujita et al. |
| 7,324,968 B2 | 1/2008 | Rotman et al. |
| 7,457,778 B2 | 11/2008 | Li et al. |
| 7,461,022 B1 | 12/2008 | Churchill et al. |
| 7,490,242 B2 | 2/2009 | Torres et al. |
| 7,493,280 B2 | 2/2009 | Guler et al. |
| 7,505,935 B2 | 3/2009 | Mendiola et al. |
| 7,552,081 B2 | 6/2009 | Dutta et al. |
| 7,627,500 B2 * | 12/2009 | Zhang et al. .................. 705/26 |
| 2001/0029478 A1 | 10/2001 | Laster et al. |
| 2001/0037255 A1 | 11/2001 | Tambay et al. |
| 2001/0042041 A1 * | 11/2001 | Moshal et al. .................. 705/37 |
| 2001/0044751 A1 | 11/2001 | Pugliese et al. |
| 2001/0049654 A1 | 12/2001 | Cecchetti et al. |
| 2001/0054021 A1 * | 12/2001 | Kawakura et al. .............. 705/37 |
| 2002/0002500 A1 | 1/2002 | Takahashi |
| 2002/0032018 A1 | 3/2002 | Morton et al. |
| 2002/0032621 A1 | 3/2002 | Smith et al. |
| 2002/0046153 A1 | 4/2002 | Piggins |
| 2002/0049738 A1 * | 4/2002 | Epstein .................. 707/1 |
| 2002/0062251 A1 | 5/2002 | Anandan et al. |
| 2002/0069157 A1 * | 6/2002 | Jordan .................. 705/37 |
| 2002/0072999 A1 * | 6/2002 | Andres et al. .................. 705/28 |
| 2002/0082974 A1 | 6/2002 | Berstis |
| 2002/0082977 A1 | 6/2002 | Hammond et al. |
| 2002/0087456 A1 | 7/2002 | Abeshouse et al. |
| 2002/0095357 A1 | 7/2002 | Hunter et al. |
| 2002/0095441 A1 | 7/2002 | Lakhani et al. |
| 2002/0099641 A1 | 7/2002 | Mills et al. |
| 2002/0107779 A1 | 8/2002 | Maltzman |
| 2002/0111874 A1 | 8/2002 | Al-Kazily |
| 2002/0111895 A1 | 8/2002 | Blair |
| 2002/0116215 A1 | 8/2002 | Lawrence et al. |
| 2002/0116281 A1 | 8/2002 | Costello et al. |
| 2002/0120552 A1 | 8/2002 | Grey et al. |
| 2002/0128913 A1 | 9/2002 | Ower |
| 2002/0138342 A1 | 9/2002 | Clark et al. |
| 2002/0138399 A1 | 9/2002 | Hayes et al. |
| 2002/0143909 A1 * | 10/2002 | Botz et al. .................. 709/223 |
| 2002/0147655 A1 | 10/2002 | Say |
| 2002/0165817 A1 | 11/2002 | Rackson et al. |
| 2002/0178104 A1 | 11/2002 | Hausman |
| 2002/0178166 A1 | 11/2002 | Hsia |
| 2002/0188551 A1 | 12/2002 | Grove et al. |
| 2002/0194051 A1 | 12/2002 | Hall et al. |
| 2003/0036975 A1 * | 2/2003 | Martin et al. .................. 705/27 |
| 2003/0051164 A1 | 3/2003 | Patton |
| 2003/0055668 A1 | 3/2003 | Saran et al. |
| 2003/0126150 A1 | 7/2003 | Chan |
| 2003/0154134 A1 | 8/2003 | Wang |
| 2003/0163831 A1 | 8/2003 | Gall et al. |
| 2003/0220867 A1 | 11/2003 | Goodwin et al. |
| 2004/0024731 A1 * | 2/2004 | Cabrera et al. .................. 707/1 |
| 2004/0093525 A1 | 5/2004 | Larnen |
| 2004/0098333 A1 | 5/2004 | Meesseman |
| 2004/0117293 A1 | 6/2004 | Lammle et al. |
| 2004/0128224 A1 | 7/2004 | Dabney et al. |
| 2004/0158549 A1 * | 8/2004 | Matena et al. .................. 707/1 |
| 2004/0220821 A1 | 11/2004 | Ericsson et al. |
| 2004/0250009 A1 | 12/2004 | Chen et al. |
| 2004/0267719 A1 | 12/2004 | Doherty et al. |
| 2005/0010483 A1 | 1/2005 | Ling |
| 2005/0018667 A1 | 1/2005 | Chandra et al. |
| 2005/0033648 A1 | 2/2005 | Jin et al. |
| 2005/0033683 A1 | 2/2005 | Sacco et al. |
| 2005/0080714 A1 | 4/2005 | McHale et al. |
| 2005/0097005 A1 | 5/2005 | Fargo |
| 2005/0114225 A1 | 5/2005 | Longman et al. |
| 2005/0114229 A1 | 5/2005 | Ackley et al. |
| 2005/0187859 A1 | 8/2005 | Growney et al. |
| 2005/0203824 A1 | 9/2005 | Freud et al. |
| 2005/0209904 A1 | 9/2005 | Hayashi |
| 2005/0262000 A1 | 11/2005 | Sato |
| 2005/0283425 A1 | 12/2005 | Grove et al. |
| 2005/0289042 A1 | 12/2005 | Friesen |
| 2006/0004648 A1 | 1/2006 | Singh et al. |
| 2006/0155637 A1 | 7/2006 | Hawkes et al. |
| 2006/0184443 A1 | 8/2006 | Erez et al. |
| 2007/0011082 A1 | 1/2007 | Lynch |
| 2007/0043647 A1 | 2/2007 | Bickford |
| 2007/0179879 A1 | 8/2007 | Pomeranz et al. |
| 2007/0203820 A1 | 8/2007 | Rashid |
| 2007/0214075 A1 | 9/2007 | Ablan |
| 2007/0239594 A1 | 10/2007 | Conwell |
| 2007/0299765 A1 | 12/2007 | Smith et al. |
| 2008/0294544 A1 | 11/2008 | Harrington et al. |
| 2009/0030813 A1 | 1/2009 | Wiesehuegel et al. |

OTHER PUBLICATIONS

Experience and inventory management in double-auction markets, Mestelman, S., Welland, D., Journal of Economic Behavior and Organization, 26(1995) pp. 35-48.

Auctionwatch Buy Now Storefronts FAQ.pdf, Jun. 9, 2001.

Auction Wizard 2000 TourInventory, Oct. 11, 2002.

How to Use—Auction Manager Pro—Inventory Management, Apr. 17, 2001.

Auctionwatch How to Use auction manager pro 0611 112001 www.auctionwatch.comlhelplamprolamprohowo~v3l_bach.htm(1I of 7) accessed Feb. 24, 2008.

www.auctionwatch.com. Dec. 4, 2001. Recovered from www.Archive.org on Feb. 1, 2008.

R. Preston McAfee, Daniel C. Quan, Daniel R. Vincent, "How to Set Minimum Acceptable Bids, with An Application to Real Estate Auctions," The Journal of Industrial Economics, vol. 50 No. 4, Dec. 2002, pp. 391-416. Retrieved via ProQuet.

AuctionWatch Business Solution Services.pdf, 20010616.

Auction Watch Products.pdf, 20020802.

Overstock, Oct. 2004, http://web.archive.org/web/20040912-20041102re_/http://overstock.com.

Flaim, Denise, "The E-Shopper: Playing A Hardball Game on eBay," Newsday, Long Island, NY, Jun. 6, 2001, p. C07.

Spanbauer, Scott, "How to Make Cash on eBay: Your Auction ABSs," PC World, Jul. 2003, vol. 21, Iss. 7, p. 150.

Auction Tamer, Apr. 9, 2003, http://web.archive.org/web/20030409155905/http://www.auctiontamer.com/auctionlisting.htm.

D.5.2, Creation of high performance DG-related databases for Information Services, M. Nov. 21, 2003, accessible (but protected) at http://www.iset.uni-kassel.de/dispowerstatic/documents/de152.pdf.

Envision Software, Inc.: Auction Tamer-Seller Add-on/Auction Poster Pro Feature, http://auctiontamer.com/auctionlisting.htm. pp. 1-13.

Geldman, A., "Evaluating e-Bay Seller Software," http://www.auctionbytes.com/cab/abu/v204/m05/abu0119/s02, pp. 1-3.

* cited by examiner

LOGO

CHECK OUT STEPS
△ LISTING DETAILS
△ PAYMENT INFORMATION
△ SHIPPING INFORMATION
△ ORDER SUMMARY
△ CONFIRMATION

SEARCH ORDER [OK] USER PROFILE  LOG OFF

CHECKOUT DETAILS
LISTING BEING PROCESSED
PENDING CHECKOUT
ORDER HISTORY

ORDER SUMMARY
LISTING TITLE COMPAQ PRESARIO LAPTOP → WON LISTING — 412

| IMAGE | PRODUCT | NAME | QUANTITY | UNIT |
|---|---|---|---|---|
| SCE_PC | CAMPUS PC 2000 | | 2.00 | PIECES |
| | CURRENT PRODUCT VARIANT: SCE_PC CAMPUS PC 2000 | | | |
| LAPTOP21 | CAMPUS PC 2000 PRESARIO PC 2000 | | 2.00 | PIECES |

WINNING BID    120.00 EUR
SHIPPING        10.00 EUR
TAX             10.00 EUR
TOTAL          140.00 EUR  ← WINNING BID AMOUNT

WON LISTING

PAYMENT INFO — 415

| PAYMENT INFORMATION | |
|---|---|
| PAYMENT TYPE | AMERICAN EXPRESS |
| NAME OF CARDHOLDER | DON DIEGO VEGA |
| NAME OF THE INSTITUTION | CITIBANK |
| CARD NUMBER | ********5343 |
| VALID UNTIL | JANUARY 2003 |

BILLING INFO — 416

| BILLING ADDRESS (CREDIT CARD ADDRESS) | |
|---|---|
| LAST NAME | VEGA |
| FIRST NAME | DON DIEGO |
| COMPANY | PRIVATE |
| ADDRESS | 3410 HILLVIEW |

| | | | | | WELCOME USER (SELLER) TO WEB AUCTION | | SIGN OFF |
|---|---|---|---|---|---|---|---|
| | | LISTING MANAGEMENT | | | | | |
| MONITOR LISTINGS | CREATE LISTING(S) | PRODUCT CATALOG | TRACK PUBLISHING | TRACK PRODUCTS IMPORT | FEEDBACKS | ORDER HISTORY | USER SETTINGS |

LISTINGS

SHOW [OPEN LISTINGS ▾] WITH [NAME ▾] [____] [GET] [OPEN ADVANCED SEARCH]

530 —

| CREATE | | | | |
|---|---|---|---|---|
| NAME | DESCRIPTION | START DATE | END DATE | STATUS |
| LAPTOP 101011 | IBM LAPTOP 1Ghz 600MB | 06/12/2003 | 10/12/2003 | 🗒 |
| LAPTOP 1010112 | IBM LAPTOP 1Ghz 400MB | 07/12/2003 | 09/12/2003 | ✎ |
| LAPTOP 1010113 | IBM LAPTOP 1Ghz 400MB | 08/12/2003 | 10/12/2003 | ✎ |
| LAPTOP 1010114 | IBM LAPTOP 1Ghz 400MB | 09/12/2003 | 11/12/2003 | ✎ |
| LAPTOP 1010115 | IBM LAPTOP 1Ghz 400MB | 10/12/2003 | 11/12/2003 | ✎ |
| LAPTOP 1010116 | IBM LAPTOP 1Ghz 400MB | 11/12/2003 | 12/12/2003 | ✎ |

/GENERAL INFO/ /PRODUCTS/ /TERMS & CONDITIONS/ (BIDS PLACED) /WINNERS/ /ORDER — 532

START PRICE 537— 1200 USD    RESERVE PRICE 1399 USD
BID INCREMENT 538— 5 USD

BIDS RECEIVED — 534

MONITORING BIDS — 535

| NAME — 532 | TIME | AMOUNT |
|---|---|---|
| PETER E | 12/12/2001 12:12 AM | 1399 USD |
| BIDDER 2 | 12/12/2001 12:12 AM ← 536 | 1390 USD |
| BIDDER 3 | 12/12/2001 12:12 AM | 1380 USD |
| BIDDER 4 | 12/12/2001 12:12 AM | 1370 USD |
| BIDDER 5 | 12/12/2001 12:12 AM | 1365 USD |
| BIDDER 6 | 12/12/2001 12:12 AM | 1350 USD |
| BIDDER 7 | 12/12/2001 12:12 AM | 1340 USD |
| BIDDER 8 | 12/12/2001 12:12 AM | 1335 USD |

PAGE 1

METHOD AND SYSTEM FOR A FAILURE RECOVERY FRAMEWORK FOR INTERFACING WITH NETWORK-BASED AUCTIONS

CROSS REFERENCE TO RELATED APPLICATIONS

This application claims priority to provisional application No. 60/562,838 filed on Apr. 16, 2004, to provisional application No. 60/565,198 filed on Apr. 19, 2004, and to provisional application No. 60/629,640 filed on Nov. 19, 2004 all of which are incorporated by reference herein.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND

The present invention relates to a method and system for implementing enhanced network-based auctions and postings-for-sale. In one embodiment of the present invention, the enhanced auctions and postings-for-sale are implemented over the Internet.

Businesses have traditionally been limited in their opportunity to dispose of their old inventory and used assets. Oftentimes, businesses have scrapped these items, generating no revenue return, or have relied on brokers to dispose of them in a manner generating revenue for the business. In turn, these brokers often use auctions as one means of disposing these assets or inventory while attempting to maximize the revenues that can be generated. These broker auctions may be limited to specific customers for particular types of items or the auctions may be open to all potential bidders. In the first case, a broker may want to limit the auction where the potential pool of actual customers is limited or where allowing an open auction may, in some manner, hinder the auction process. In the latter case, where the auction is open to all potential bidders, it is often beneficial to maximize the number of people participating in the auction in order to extract the greatest price for the asset being auctioned. The problem in this latter case has been in attracting a large enough auction audience to facilitate a maximization of the return on the disposing of the asset.

The advent of the Internet along with the accompanying revolution in computer and network technology has created new auction paradigms, including several forms of network-based auctions. The Internet provides the ability to aggregate large numbers of bidders in all types of auctions, such as, for example, ascending bid auctions, reverse auctions, and Dutch auctions. Priceline.com® is an example of a traditional reverse auction process made available over the Internet. In another example, eBay® provides a traditional ascending bid auction service over the Internet. An eBay® type ascending bid auction is ideally suited for the broker auction process discussed above. Since its founding in 1995, eBay® has become the world's largest online marketplace providing a powerful platform for the sale of goods and services among a passionate community of individuals and businesses. Everyday, millions of items across thousands of categories are available on eBay®, for sale by auction and for a fixed price, enabling trade on a local, national, and international basis with customized Internet Web sites in markets around the world.

Businesses have typically kept their information, including information regarding the assets and inventory they wish to sell or auction off, in database systems that are part of their corporate information systems. For example, SAP® A.G. of Germany provides data management tools such as their SAP® (R/3®) and my SAP™ Customer Relationship Management (CRM) system that can manage this type of information. Conventional systems do not provide the automatic linking between these business information management systems and online Web auction services, such as eBay®, and, therefore, manual involvement with the Web auction service is required for each auction or sales posting conducted. Providing a system linking business information management systems with a Web auction service and automating the auction submission, tracking, and post-auction processing will considerably improve the ability of businesses to sell or auction off assets, such as current or old inventory, in a manner allowing greater price maximization, and thereby increasing business revenue.

BRIEF DESCRIPTION OF THE DRAWINGS

FIG. 3c is a diagram illustrating the specification of listing information in the seller interface of the auction application according to one embodiment of the present invention.

FIG. 3d is a diagram illustrating a listing published on a Web auction service according to one embodiment of the present invention.

FIG. 4b is a diagram illustrating a sample checkout Web page for a seller site (auction application) run checkout process according to one embodiment of the present invention.

FIG. 5a is a diagram illustrating a seller interface display allowing a seller to monitor his/her listings according to one embodiment of the present invention.

FIG. 5d is a diagram illustrating the viewing of bidding information for an auction listing according to one embodiment of the present invention.

DETAILED DESCRIPTION

Figure 1A:
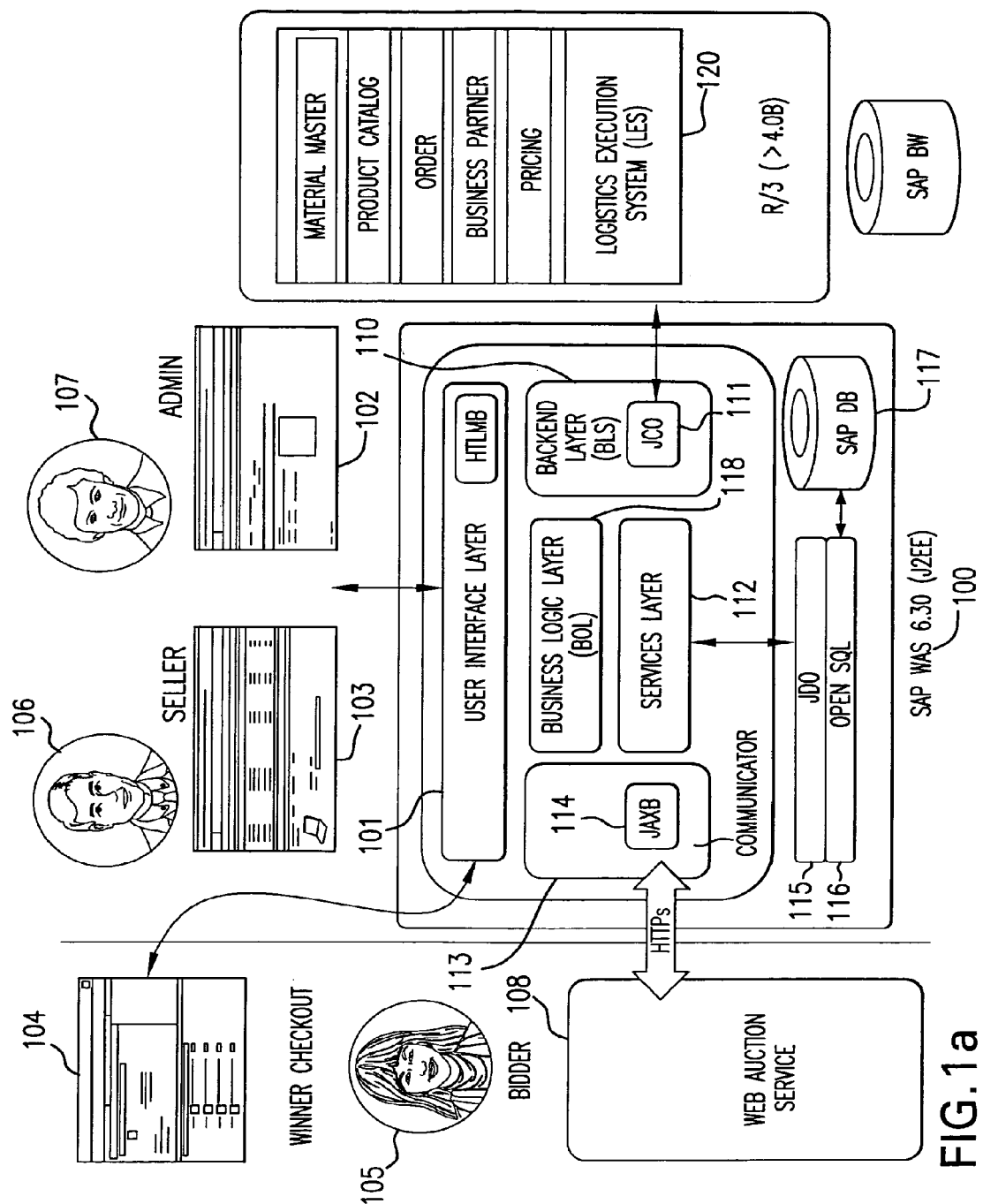
FIG. 1a is a diagram illustrating the high level architecture of the enhanced network-based auction service according to one embodiment of the present invention.

A method of failure recovery is provided that includes providing an automatic failure recovery transaction in an auction application interacting with a network-based auction service. The network-based auction service has a forward-only process that is adapted to prevent roll-back to a process state at a time of a failure. If the failure occurs within the forward-only process, the method includes automatically conducting a roll-back to a beginning of the forward-only process by the auction application.

The at least one roll-back period may correspond to a defined discrete process transaction through an auction process.

The at least one roll-back period may include a reservation creation, a publishing operation, a receiving of a winner notification, a linking of a winner information to a backend, and/or an order creation operation.

The auction application may interact with a backend business information system.

A computer readable medium is provided that includes instructions adapted to execute a method for failure recovery. The method includes providing an automatic failure recovery transaction in an auction application interacting with a network-based auction service. The network-based auction service has a forward-only process that is adapted to prevent roll-back to a process state at a time of a failure. If the failure occurs within the forward-only process, the method includes automatically conducting a roll-back to a beginning of the forward-only process by the auction application.

According to one embodiment of the present invention, a method and system for integrating a business information management system with a Web auction service is provided through an auction application. The auction application allows a seller to generate listings (e.g., auctions and postings-for-sale), allows for the execution of listings on a Web auction service, processes winning bidder/buyers, and monitors existing listings leveraging the power of a seller's business information management system. The auction application serves as the bridge between on the one-hand the seller and the seller's business information management system and on the other hand the Web auction service and the winning bidders/buyers.

Architecture:

According to an embodiment of the present invention, an application for the enhanced network-based auction services ("auction application") links an existing business information management system with a network-based auction service (hereinafter also referred to as a Web auction service). In this embodiment, the auction application is a component-based multi-tier application developed according to the Java™ 2 platform, enterprise edition standard (J2EE™) and running on top of the SAP® Web Application Server (SAP® Web AS). The auction application is linked to a business information management system, such as, for example, SAP® R/3®, using business information management system plug-ins to tie the auction application to the business information management system backend functions. The auction application is also linked to a Web auction service using communication protocols such as, for example, HTTP, secure HTTP, and SOAP protocols.

FIG. 1a is a diagram illustrating the high level architecture of the enhanced network-based auction service according to one embodiment of the present invention. The auction application 100 in this embodiment is deployed as a J2EE™ web application running on top of the SAP® Web AS. The auction application 100 allows users (e.g., sellers, bidders/buyers, and administrators) to communicate with it through a user interface layer 101. In FIG. 1a, three user interfaces are shown: an administrator user interface 102; a seller user interface 103; and a bidder/buyer user interface 104. The administrator user interface 102 allows administrator level—not seller specific—functionality for the auction application 100 primarily relating to auction application configuration and user authorizations. The seller interface 103 provides functionality to a seller 106 for managing its network-based auctions and postings-for-sale (i.e., listings). For example, a seller 106 may generate and manage listings through the seller interface 103. A seller 106 may also monitor listings through the seller interface 103. Other functions that may be available through the seller interface 103 may include, for example, the generation and maintenance of a product catalog, scheduling and tracking the publishing of listings on the Web auction service 108, the generation of feedback relating to the listings, and setting seller preferences. The bidder/buyer user interface 104 provides functionality to allow a winning bidder/buyer 105 to interact with the seller 106 and auction application 100 to make necessary arrangements for finalizing the execution of the winning bid or purchase made on the Web auction service 108.

In the embodiment depicted in FIG. 1a, the user interface layer 101 uses HTML to implement the user interfaces 102-104. In particular for the seller user interface 103 and administrator user interface 102, a protocol such as the SAP® secure HTML for Java™ may be used to implement HTML with Web controls using comprehensive tags. In addition Struts, an open-source tool, may be used to segregate the business data and logic from the user interfaces while implementing complex user interfaces using, for example, Java™ servlets, JavaBeans™, and Enterprise JavaBeans™.

The backend layer (BLS) 110 is the part of the auction application 100 that handles the communication with the business information management system 120. In the embodiment depicted in FIG. 1a, the business information management system 120 is an SAP® R/3® application release 4.0 or higher. The backend layer 110 uses the SAP® Java™ Connector (JCo) component 111 in this embodiment to provide the communication between the J2EE™ auction application environment and the business information management system 120.

The services layer 112 includes functional components for process management of the enhanced network-based auction process as depicted in FIG. 1a. In particular, the services layer 112 handles the interface with a database 117 used by the auction application 100 to store, for example, product and listing information. The services layer 112 may use Java™ Data Objects (JDO) 115 for information sent to or retrieved from the database 117, in this example an SAP® DB database. In this embodiment, OpenSQL 116 is used as the query language for interaction with the database 117. In addition, the services layer 112 may provide specialized functional service components such as the Web auction service communicator 113 (referred to in FIG. 1a as the Communicator) discussed later. Web auction service communicator 113 may be a communicator adapted to be used with one or more network-based auction services, and/or may include different pluggable components for different network-based auction services.

Other functional service components may include a scheduler for the scheduling of tasks by the auction application 100. For example, a task may be an object with an executable block of program code enclosed with timing information inside a job. The scheduler may run as a service in J2EE™ handling the execution and management of jobs and task by the auction application 100. Some scheduled tasks may involve interfacing with the Web auction service 108. For example, a listing creation task may be used to create a listing in the Web auction service 108 at a scheduled time. In another example, a winner poll task may be used to synchronize information about listings that have been won or postings-for-sale that have successfully been responded to. A bid synchronization task may synchronize information about bids for a listing maintained by the auction application 100 with the bid information maintained by the Web auction service 108. A category synchronization task may be used to synchronize the descriptive and search categories used by the Web auction service 108 with categories used by the auction application 100. A feedback task may synchronize feedback information for a listing or seller 106 provided by Web auction service bidders 105 with the auction application 100. The above example tasks specifically refer to the transfer and synchronization of information between the Web auction service 108 and the auction application 100. Other tasks may be internal to the auction application 100 or may involve synchronization with the business information management system 120. For example, a product catalog synchronization task may update product details for a listing in the auction application 100 (and eventually the Web auction service 108) with the product details in the business information management system 120.

Another functional service component may include an internal recovery manager to manage failures in network-based communications and transactions between the auction application 100 and the Web auction service 108. A persistence manager is another example of a functional service component that can be used to ensure data persistence between the data used in the auction application 100 and data in the database 117. Specifically in FIG. 1a, the persistence manager may handle data persistence between the business objects used by the auction application 100 and the Java™ data objects 115. The Java™ data objects 115 map to the database 117 through OpenSQL 116 as provided for in the SAP® Web AS.

An embodiment of auction application 100 provides a method and system to recover information and/or recover from a system failure. For example, the auction application 100 may enable a user (e.g., seller 106 and/or administrator 107) to recall steps in a listing initiation process. Conventionally, when a user attempts to publish a listing in Web auction service 108, various steps may be performed, sometimes in multiple systems. These steps may validate the listing with the Web auction service 108 and the Web auction service 108 may send information to a backend system such as the business information management system 120. Conventionally, a Web auction service 108 may prevent a user from going back a step, perhaps allowing only forward movement through screen prompts. Limiting the direction of the progress through screen prompts may be due to the involvement of multiple systems in the process.

Therefore, in case of a failure of some sort, for example a screen freeze, a keyboard lockup, system crash, network communication error, network or power outage, etc., it may be useful to provide a system that returns a user to the most recent step on which the user was working. One embodiment of the present invention may record steps in the auction listing process and thereby provide a method for returning to the previous screen or prompt, or to any previous screen or prompt.

This embodiment of the present invention may be useful in any multi-phase application that provides a series of screens or prompts to a user in which the system limits the ability of the user to return to a previous screen and/or prompt. In this embodiment, a process may return to an initial screen/prompt and then functionally input a recording of entries and/or responses until the previous screen/prompt before the lockup, system failure, etc. or to a previous point determined by a user.

Conventional systems may not allow the release of a reservation of a quantity of a product in a listing after a predetermined period of time passes (the entry may have a certain life span). Therefore, it may be useful to recover a transaction to prevent the system from duplicating reservations for product quantities.

For example, a user may create a listing and begin to publish the listing before an electricity failure. The auction application 100 may have reserved the quantity of the product in the listing in the business information management system 120 but not published the listing to the Web auction service 108. In this situation, a user may re-attempt publishing the listing and thereby avoid creating a new reservation for the quantity of the product in the listing. In an embodiment of the present invention may enable a user to resume the listing publishing process at a step saved in the database.

In a system that operates in conjunction with two or more non-compatible systems, a user may be prevented from returning to an initial prompt or screen. In this situation, an alternative embodiment of the present invention may enable the user to return to an intermediate state and/or a beginning of a last-good state. The intermediate state or last-good state may represent, for example, a beginning or end of any of the following functions: creation, reservation, publication, create customer, create order, check payment, release delivery block, and/or deliver product.

According to one embodiment of the present invention, the auction application 100 may incorporate milestones in particular transactions/processes at which point the transaction state information is saved and at which point a transaction can be recovered. Alternatively, the user may define milestones in the system to facilitate the return to an intermediate step. For example, the user may configure transaction milestones relating to the creation of a customer, publication, or any other appropriate milestone. If the auction application 100 or another system utilizing this exemplary method fails to respond and/or locks-up at the same point in the process, the user may know that the error is caused by the screen and/or the system accessed by the screen when the lock-up reoccurred.

According to one embodiment of the present invention, a failure recovery manager models each of the processes as a series of steps with each execution of a process treated as a process instance. For example, a process to publish a listing may include four steps: 1) save listing; 2) create quotation/reservation; 3) publish to Web auction service; and 4) save listing again. Each time a publish listing process is executed according to this embodiment, it is assigned a unique identifier (e.g., listing identifier) and treated as a single instance of the process having a state holder used by the failure recovery manager to track the execution of the process. The failure recover manager tracks how far a process instance has successfully executed and maintains and updates state information before and after the execution of each step in the process. If the execution of a process instance fails at any intermediate step, the execution of the process instance terminates but the failure recovery manager may use the state holder information to resume the process instance from the last successfully completed step.

The Web auction service communicator 113 provides the interface between the Web auction service 108 and the auction application 100. The Web auction service communicator 113 translates auction application 100 actions to Web auction service 108 API calls. For example, an auction application 100 action to create or publish a listing may be translated into a Web auction service 108 API call such as "AddItem." Using eBay®, as an example, the AddItem call sends a request to the eBay® platform to post a listing and includes arguments such as, for example, a definition of the item being sold, payment methods the seller is willing to accept, and global regions the seller will and will not ship the item to. The Web auction service communicator 113 translates the "create listing" auction application activity into the "AddItem" Web auction service 108 API call. The API call may be placed in an XML packet using the SAP® Java™ XML binding toolkit 114, which allows the mapping of Java™ objects to XML documents. The XML packet may include specific information including packet header data. For example, the XML packet may include an Identifier including the seller 106 user ID and password for the Web auction service 108, an API call identifier for the Web auction service 108 API call, and call parameters such as the API call arguments. The XML packet may be transmitted between the auction application 100 and the Web auction service 108 by means of an HTTP request. Information received from the Web auction service 108 may be received as an HTTP request and its content may be mapped to Java™ objects also by using the SAP® Java™ XML binding toolkit 114.

One aspect of the auction application 100 is the business object layer 118 (also referred to as the business logic layer 118 in FIG. 1a). The business object layer 118 may communicate with the user interface layer 101 using JavaBeans™ to transfer data. Data is transferred in either direction by generating and transferring the appropriate JavaBeans™. At the business object layer 118, processing and interaction of data between the users and user interface layer 101, the business information management system 120, the Web auction service 108, and the service layer 112 with its component services (including data from the database 117) occurs. The business object layer 118 may be implemented using a commercial architecture such as, for example, the SAP® Internet Sales Architecture (ISA) framework as part of the SAP® Web Application Server. In one embodiment of the present invention, the ISA framework is used throughout the auction application 10 including in the communication between the winning bidders/buyers 105 and the business information management system 120 through the use of plug-ins to allow the ISA framework to link to, for example, the SAP® R/3® backend 120.

Figure 1B:
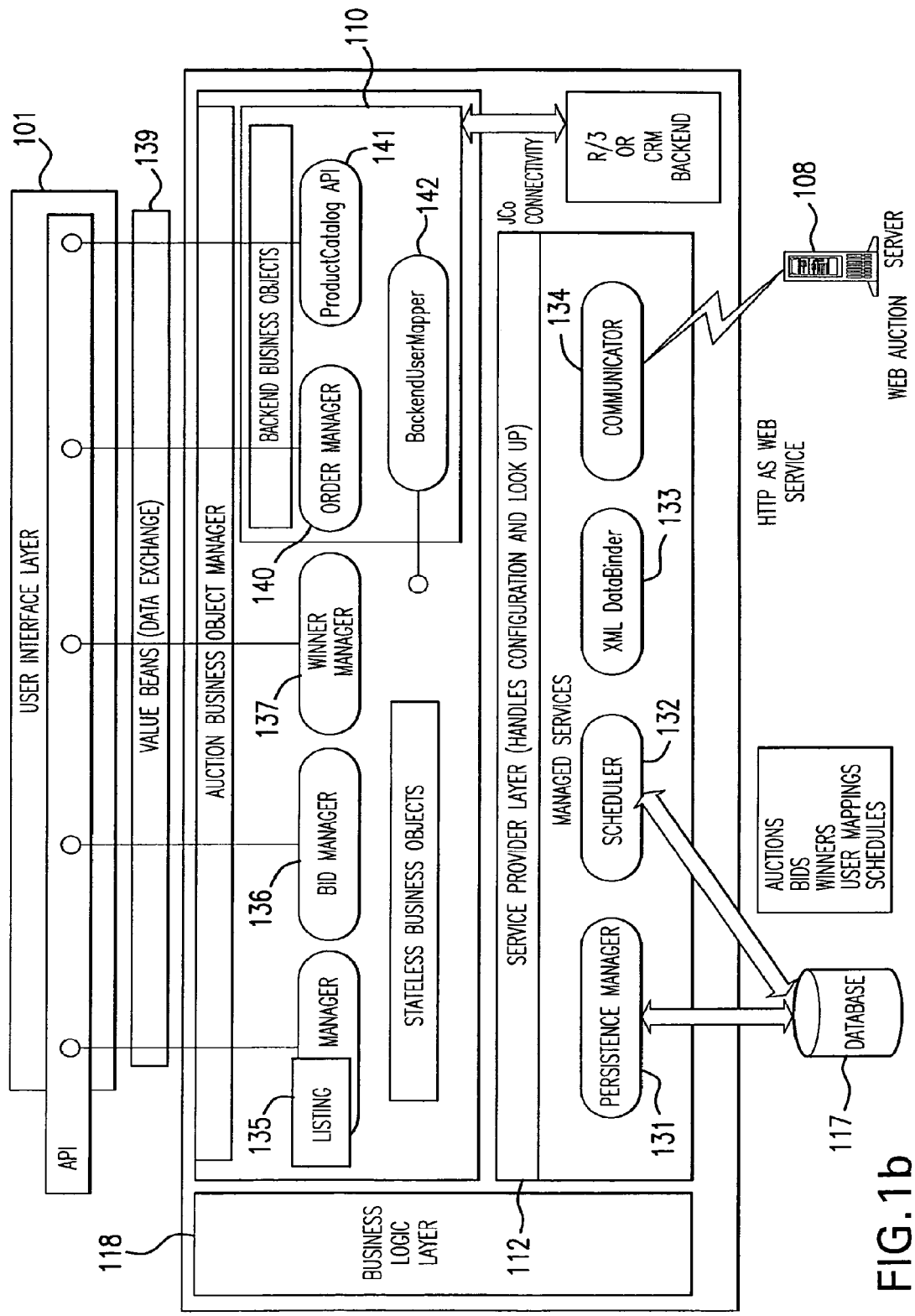
FIG. 1b is a diagram further illustrating the architecture of the auction application according to one embodiment of the present invention.

FIG. 1b is a diagram further illustrating the architecture of the auction application according to one embodiment of the present invention. In the embodiment depicted in FIG. 1b, the business object layer 118 (also referred to as the business logic layer) includes the backend layer (BLS) 110 and services layer 112 (also referred to as the service provider layer) that were shown separately in the embodiment in FIG. 1a. Business objects 135-137 include, for example, an auction manager 135, bid manager 136, and winner manager 137 which communicate with the user interface layer 101 by means of JavaBeans™ 139. The backend layer 110 may include objects that communicate with the user interface layer 101. For example, an order manager 140 may allow a buyer 105 to communicate with the business information management system 120 backend through communication between user interface layer 101 objects and backend layer system 110 objects using JavaBeans™ 139. The backend layer system 110 may also communicate with business object layer 118 business objects 135-137. For example, a backend user-mapping object 142 in the BLS 110 may allow business objects in the BOL 118 to access data in the business information management system 120. As previously discussed, the service layer 112 may include a number of functional service components including a persistence manager 131, a scheduler 132, a Web auction service communicator 134, and a Java™ object-to-XML data binding service 133.

The SAP® Internet Sales Application (ISA) framework for the SAP® R/3® system is used according to one embodiment of the present invention. In an alternative embodiment other frameworks may be used, for example, to integrate an SAP® CRM backend with the auction application instead of an SAP® R/3® backend.

The business objects in the business object layer 118 are functional components providing a number of services according to the embodiment depicted in FIG. 1b. For example, the listing manager 135 may include codes for a number of functions such as: create listing, create listing template, copy listing, modify listing, view listing details, publish listing, publish listing by schedule, activate listing, cancel listing, close listing, and search listings. The "create listing" function allows a seller 106 to create a new listing for an auction or a posting-for-sale. A listing may be created in a number a ways including by selection from a product catalog, database query, database report, manual entry, using a listing template, and in loading an external file. The listing manager 135 allows the seller 106 to provide listing specific information and may validate that the requirements of the Web auction service 108 for the listing are met. For example, a Web auction service 108 may require that particular information is included when a listing is created. The "create listing" function may then validate that the seller 106 included the information and otherwise prompts the seller 106 for this information. The "create listing template" function allows a seller 106 to create a template for use with future listings. The information provided by the seller 106 for the template is automatically used when the seller 106 selects the template during the "create listing" function discussed above. The seller 106 may then modify template information or add information omitted from the template to complete the new listing. A listing template facilitates the generation of multiple listings particularly when similar listings are going to be scheduled at multiple times. The "copy listing" function allows a seller 106 to copy the information from an existing or stored prior listing into a new listing—the seller 106 creates a new listing from an existing or old listing. The seller 106 finds the existing or old listing to be copied, selects the "copy listing" function and then edits the listing information to generate a new listing. The "modify listing" function allows a seller 106 to modify the attributes of an existing listing to the extent allowed by the Web auction service 108. For example, a Web auction service 108 may allow a listing to be modified until it becomes active at which time the listing is locked and no further changes to its attributes can be made during the execution of the listing. A Web auction service 108 may also allow changes to particular listing attributes during the execution of the listing. For example, a seller 106 may be allowed to change the reserve price during the execution of an auction. The Web auction service 108 requirements need to be accounted for by the "modify listing" function to avoid conflicts between the auction application 100 and the Web auction service 108. The "view listing details" function allows a seller 106 to view the details of a listing and may include information about an active listing that is being executed. For example, the "view listing details" function may retrieve bidding information for an active auction listing that is being executed (i.e., the auction is in progress). The "view listing details" function may be divided into two functions: one for viewing the listing details and a second for viewing details regarding the execution of the listing on the Web auction service 108. For example, the "view listing details" function may provide information regarding the listing itself while a "view bid history" function may provide listing execution information from the Web auction service 108. The "publish listing" function allows a seller 106 to submit a created listing for publication by a Web auction service 108. The "publish listing by schedule" function allows a seller 106 to schedule the publication of a listing already created or based on a listing template. For example, a listing template may be used to schedule a similar listing to be published every week, day, month, etc. The "activate listing" function allows a seller 106 to activate a listing before the submitted start time of the listing provided that the Web auction service 108 allows the manual activation of a listing. Under some circumstances, the manual activation of a listing may be necessary if a Web auction service 108 does not require a start date for a listing and one is not provided. The "close listing" function allows a seller 106 to close a listing before the submitted end date and time of the listing provided that the Web auction service 108 allows changing the conclusion date of the listing. The "cancel listing" function allows a seller 106 to cancel a listing before it becomes active with a Web auction service 108. It is unlikely that a Web auction service 108 will allow the canceling of an active listing but if this is allowed, the "cancel listing" function may allow the canceling of an active listing as well. The "search listings" function may allow a seller 106 different ways to search through listings. For example, the searching may occur only for seller 106 created listings stored by the auction application 100 in its own database 117 or in the business management information system 120. The "search listings" function may also allow a seller 106 to search through listing on the Web auction service 108. The "search listings" function may also incorporate different ways to conduct the search to include, for example, searching by product, start date, end date, listing status, description, category, etc. Other examples of listing manager 135 component functions may include a "bidder/buyer feedback" function to display to the seller 106 bidder/buyer feedback provided to Web auction service 108 regarding the listing and seller and a "listing finalization" function to trigger post-auction/sale processing including the retrieval of winning bidder/buyer information and creating an order in the business information management system 120.

In another example of a business object layer 118 object, the bid manager 136 may include code for viewing the bid history or sale history of a listing. Though previously described as part of the "view listing details" function of the listing manager 135, this function may additionally or alternatively be included in the bid manager 136. As previously stated, the "view bid history" function may allow a seller 106 to view all the bids with associated information (e.g., date and time) for a listing and may allow the viewing of a bid history for listings that are active or closed. The winner manager 137 may include code to allow a winning bidder/buyer 105 to communicate with a seller 106 in order to handle and process payments and to direct shipping of the listing product(s). The winner manager 137 may include functions used to trigger post-auction/sale processing including the retrieval of winning bidder/buyer information and creating an order in the business information management system 120 in the same manner as the potential "list finalization" function discussed within the listing manager 135.

The backend layer (BLS) 110 objects are also functional components providing additional services for the auction application 100 according to one embodiment of the present invention. The BLS layer 110 handles communications with the backend system, the business information management system 120, with which the auction application 100 integrates. In the diagrams depicted in FIGS. 1a and 1b, the backend system 120 is the SAP® R/3® system. In other embodiments, other business information management systems can be used as the backend to the auction application 100. For example, SAP® CRM may serve as an alternative backend. One example of a BLS 110 object is the order manager 140, which may include code for a number of functions such as: creating an order in the backend system 120, viewing the order in the backend system 120, and searching the backend system orders. The winner manager 137 as discussed above may trigger the execution of the order manager 140. The "create order" function allows the auction application 100 to create an order in the backend system 120 for a winning bidder/buyer 105 of a listing as part of the checkout process. The order is created using listing execution information (e.g., winning bidder/buyer and associated information, price, quantity, etc.) obtained from the Web auction service 108. The order in the backend 120 may be associated with the listing through adding (at least one) order identifier to the listing information in the auction application 100 and by adding a listing identifier to the order in the backend 120. The order may include shipping details and payment information for the winning bidder/buyer 105. The "view order" function allows a seller 106 to retrieve information through the user interface layer 101 about the order and its status from the backend system 120. The "search orders" function allows a seller 106, through the user interface layer 101, to search for information about multiple orders in the backend system 120. The "search orders" function may allow a seller 106 to use different parameters to conduct the search in order to sort, aggregate, and/or limit orders in the results.

The product catalog API object 141 is another backend layer (BLS) 110 functional component allowing retrieval and searching of data in the product catalog of the business information management system 120 as well as quantity reservation of products included in a listing. A "view product catalog" function allows a seller 106 to view products available in a product catalog maintained by the backend, business information management system 120. As previously discussed, a seller 106 can use this product catalog to select products for inclusion in a listing. The "view product catalog" function may incorporate filtering to filter out products based on particular attributes. This filtering may be performed by the backend system 120 or by the "view product catalog" function in the Java™ runtime environment in order to display only listing-actionable products to a seller 106. The auction application 100, in this embodiment, operates in a J2EE™ runtime environment and interacts with the product catalog of the backend system 120 through a Java™-based API called PCATAPI which is the means of interaction between the product catalog API object 141 and the product catalog according to this embodiment. The "search product catalog" function also uses PCATAPI which allows SAP® TREX-based searching of the product catalog. The "search product catalog" function may allow a seller 106 a variety of possible search parameters for finding a desired product. The "quantity reservation" function may be triggered during the listing creation process or at a later time in order to prevent the quantity of the product included in the listing from being otherwise disposed. For example, when a listing is first generated and a quantity "x" of a product is included in the listing, the "quantity reservation" function may be executed to reserve "x" quantity in the product catalog so that it remains available for the winning bidder/buyer 105. Alternatively, the "quantity reservation" function may be executed after the listing is created such as, for example, when a listing is published or activated on a Web auction service 108 or when a winning bidder/buyer 105 is determined.

The service layer 112 objects are also functional components providing services for the auction application 100 according to one embodiment of the present invention. The service layer 112 objects are system level components that do not directly communicate with the user interface layer 101 and the backend system 120. The persistence manager 131 is a service layer 112 object that ensures data persistency and object relational persistency for the auction application 100. The persistence manager 131 also handles any data redundancy requirements during database 117 changes or queries to ensure the integrity of the data. The scheduler 132 is another example of a service layer 112 object that handles the scheduling of background jobs and tasks as previously discussed. The scheduler 132 primarily handles the scheduling of jobs (i.e., communicating tasks) with the Web auction service 108. The XML data binder 133 is a service layer 112 object responsible for the mapping in both directions of Java™ objects and XML documents necessary for the communication between the auction application 100 and the Web auction service 108 according to this embodiment of the present invention. The Web auction service communicator 134 is an example of a service layer 112 object that handles the communication between the auction application 100 and the Web auction service 108.

The Web auction service communicator 134 may communicate with the Web auction service 108 by using HTRP and secure HTTP communication by means of post and get requests. Communication with the Web auction service 108 needs to conform to the Web auction service 108 API and the Web auction service communicator 134 is designed to generate requests using the Web auction service 108 API calls. The Web auction service communicator 134 may place the Web auction service 108 API calls inside an XML packet (i.e., an XML document) which is sent in the HTTP request. According to one embodiment, the XML packet includes: user attributes such as a seller ID and a seller password to authenticate the seller 106 to the Web auction service 108; license attributes providing a developer license key where necessary; call identifier for the Web auction service 108 API call (i.e., the API function call name); call parameters corresponding to the API call parameters; and error attributes for returning errors from the Web auction service 108 to the auction application 100. Using eBay® as an example, the following table includes samples of Web auction service 108 API function calls, a brief description of their purpose, and an auction application 100 component that may initiate the API call:

| ebay ® API | Description | Corresponding Auction Application Object |
| --- | --- | --- |
| GetAPIVersion | Returns the API version called on ebay server | Internal API |
| AddItem | Publishes an Auction to ebay | AuctionManager.createAuction |
| ReviseItem | Modifies an existing Auction on ebay | AuctionManager.modifyAuction |
| RelistItem | Relists an earlier listed Auction which closed without winners | Auction Manager.modifyStatus |
| VerifyAddItem | Verifies the Listing and return the Auction Fee but does not publish the Auction on ebay | AuctionManager.verifyAuction |
| EndItem | Prematurely close an Auction on ebay | AuctionManager.closeAuction |
| GetItem | Retrieves the Auction data from ebay | AuctionManager.getAuction |
| GetCategories | Retrieves the huge Category Tree on ebay | CategoryManager.getCategories |
| GetCategory2CS | Retrieves the Category Sets | CategoryManager.getCategorySets |
| GetAttributesCS | Retrieves the attributes of a category set | CategoryManager.getAttributes( ) |
| GetSellerTransactions | Retrieves the Transactions done on ebay for a Seller between a certain time window | CategoryManager.getTransactions |
| GetItemTransactions | Retrieves the Transactions on ebay for an Auction between a certain time window | TransactionManager.getTransactions |
| GetSellerEvents | Retrieves the ebay Events for a Seller between a certain time window | Internal API |
| GetAPIAccessRules | Retrieves the API Access Rules on ebay Server | Internal API |

-continued

| ebay ® API | Description | Corresponding Auction Application Object |
|---|---|---|
| GetHighBidders | Retrieves the list of highest bidders for an Auction | BidManager.getHighBidders |
| LeaveFeedback | Leaves feedback for a buyer by Seller on ebay | FeedbackManager.provideFeedback |
| RetrieveFeedback | Retrieves the feedback for a Seller between a certain time window | FeedbackManager.retrieveFeedback |
| GetEBayUser | Retrieves the data for a Buyer from ebay | UserMapper.getUser |

The Web auction service communicator 134 is specific or unique to a particular Web auction service 108 allowing the remainder of the auction application 100 to be general and relate to any Web auction service 108 according to one embodiment of the present invention. According to this embodiment, the communicator 134 code is modular and can be replaced and or augmented allowing the auction application 100 to work with a plurality of Web auction services 108 as long as the appropriate communicator 134 is present. For example, the Web auction service communicator 134 may be stored in a plug-in or servlet used by the auction application 100 that can easily substituted with the appropriate plug-in or servlet for another Web auction service 100 if and when needed.

Figure 1C:
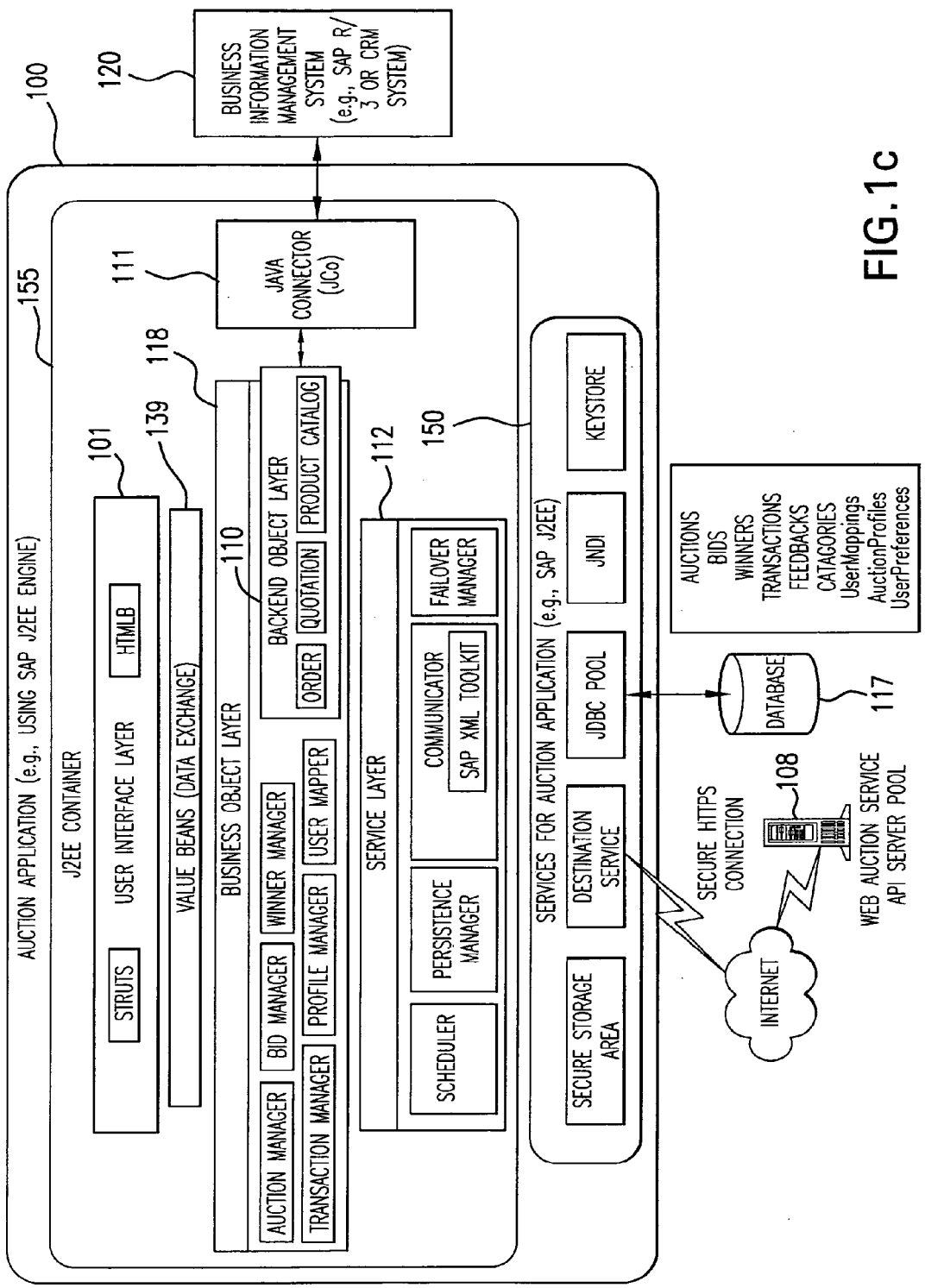
FIG. 1c is a diagram further illustrating the architecture of the auction application according to one embodiment of the present invention.

FIG. 1c is a diagram further illustrating the architecture of the auction application according to one embodiment of the present invention. According to this embodiment, the auction application 100 includes a J2EE™ application environment container 155 containing the user interface layer 101 and business object layer 118 communicating using JavaBeans™ 139 as already discussed. The business object layer 118 in this embodiment includes the backend layer 110 but the services layer 112 is separate. A Java™ connector is still used by the backend layer 110 in communicating with the business information management system 120. The auction application 100 additionally includes further services 150 that fall outside the J2EE™ container 155. This embodiment is only one further example of the many possible architectures for the auction application that may be employed in various embodiments of the present invention.

Different embodiments of the present invention can be implemented using different architectures, products, and services other than in the example embodiments described herein. The present invention is not intended to be limited to the products, environments and standards described herein and may be implemented in different ways in other embodiments of the present invention.

Deploying The Auction Application:

According to the example embodiment of the present invention, the auction application 100 is developed using the J2EE®-based SAP® Web application server.

The current release of SAP® Web AS only includes by default functionality for digital signatures and not the encryption necessary to implement Secure Sockets Layer (SSL) protocol. For example, by default SAP® Web AS may allow the auction application 100 to, as part of securing communication, use public key technology to send and receive encrypted message digests in order to validate the other party to the communication—what is commonly known as using digital signatures. However, the complete version of the SAP® Java™ Cryptographic Toolkit may have to be loaded when deploying the auction application 100 in some circumstances according to this embodiment. The SAP® Java™ cryptographic toolkit provides support for certificates, symmetric cryptographic algorithms, and message authentication code (MAC) values (e.g., using MD5) necessary for Secure Sockets Layer (SSL) protocol-based secure communication over the Internet—in particular the HTTP request-based communication between the auction application 100 and the Web auction service 108.

If necessary, loading the complete cryptographic toolkit may be described in the technical documentation provided by SAP® and may in addition be available from SAP® technical support personnel. This additional step may only be relevant regarding the example embodiment discussed above which is based on an early version of SAP® Web AS. In other embodiments of the present invention, this issue may be irrelevant.

In the example embodiment of the present invention, the auction application 100 is not specific to any one Web auction service 108. Instead, the auction application 100 may be used with many possible Web auction services 108. Using the auction application 100 with a specific Web auction service 108 may entail the use of an appropriate Web auction service communicator 113, 134 specific to the Web auction application 108. The specific details of the communication and interaction between the auction application 100 components (objects) and the Web auction service 108 may be hard-coded into this specific Web auction service communicator 113, 134. According to this embodiment, the Web auction service-specific interfacing is done through the Web auction service communicator 113, 134.

Figure 2:
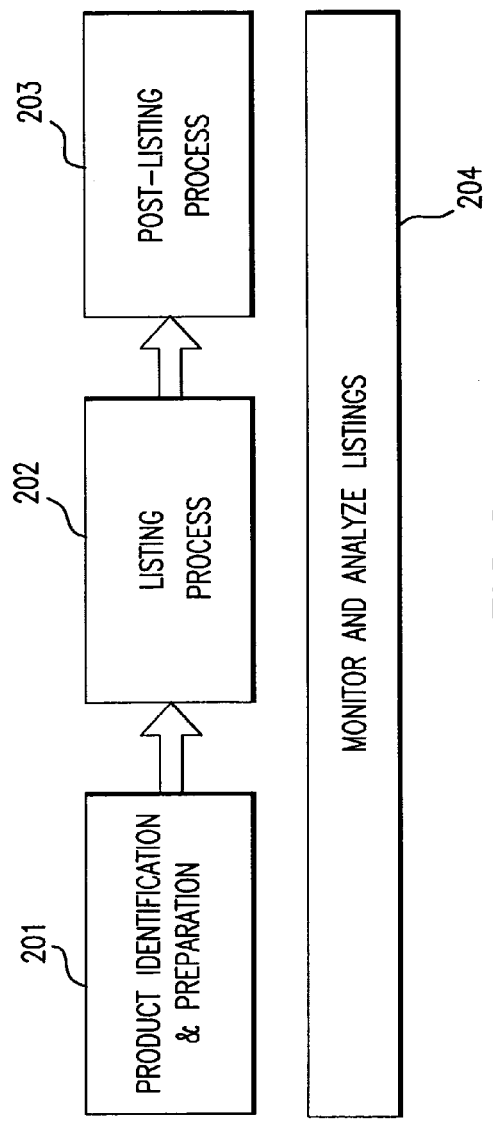
FIG. 2 is a diagram illustrating a top-level abstraction of the enhanced network-based auction process according to one embodiment of the present invention.

Enhanced Network-Based Auction Process:

FIG. 2 is a diagram illustrating a top-level abstraction of the enhanced network-based auction process according to one embodiment of the present invention. The enhanced network-based auction process 200 is divided into four process steps: product identification & preparation 201, the listing process 202, post-listing processing 203, and monitoring and analyzing listings 204. The product identification & preparation step 201, the listing process step 202, and the post-listing processing step 203 are performed sequentially for each listing (i.e., auction or posting-for-sale) conducted by a seller (e.g., a business entity). The monitoring and analyzing listings step 204 may be performed continually throughout the entire process and does not need to be performed in a sequence relative to the other process steps.

The first step in the enhanced network-based auction process is the product identification & preparation step 201 according to this embodiment of the present invention. During this step, two actions in particular may occur: 1) identifying the product(s) to be auctioned or posted-for-sale; and 2) gathering information about the product(s). The identification of products by a seller (e.g., a business) 106 can occur in a number a ways using a business information management system 120 according to one embodiment of the present invention. For example, a seller 106 may manually compile a list by directly entering the information into the auction application. In another example, a seller 106 may manually retrieve data from a database or legacy software application, such as, for example, a Microsoft® Excel spreadsheet. According to this example, the product information is extracted from the legacy software (e.g., Microsoft® Excel) by exporting the selected data into a file and loading the file into the auction application 100. In another example, a seller 106 may execute a report or query on the backend business information management system 120 returning a listing of products from which the seller 106 may make a selection. The report or query may be generated using whatever selection parameters are available to limit the results and assist the seller 106 in identifying the desired product(s) in an expeditious manner. The fields or columns available in the business information management system 120 database tables may determine these selection parameters. For example, if a field or table allows storing information on inventory location, then inventory location is a potential parameter that may be used in generating the report or in forming the query from which an identification of the product(s) to be auctioned or posted-for-sale can be made. The selection parameters may also be determined using calculated values derived from stored information in the tables of a business information management system 120. For example, if a field or table stores information regarding when a product was received or otherwise became part of the inventory, a calculation using the current information can be made to determine the number of days the product has been carried as inventory. Therefore, for example, the number of days a product has been a part of the inventory may be a selection parameter used in generating the report or in forming the query from which an identification of the product(s) to be auctioned or posted-for-sale can be made.

In the example embodiment shown in FIG. 1a, the SAP® R/3® system is the business information management system 120 from whose databases a report or query can be executed and used in the product identification process. Another example of a business information management system 120 including a database system from which a report or query can be executed is the SAP® CRM system. For example, the product may exist in the mySAP™ Customer Relation Management (mySAP™ CRM) system as a product master or may exist in the SAP® R/3® system in the Material Management (MM) module. In other embodiments of the present invention, idle assets may exist in the Asset Management (AM) module of the SAP® R/3® system and equipment may exist in the Plant Maintenance (PM) module of the SAP® R/3® system. In conjunction with SAP® R/3®, other tools can be used in generating the reports and queries from which product identification can be made, including: SAP® Business Information Warehouse (BW) (reports), SAP® ABAP™ (reports and queries); SAP® R/3® modules such as the Sales Information System (SIS); and third party reporting and query systems. Regardless of the tools used, the product identification and preparation process 201 can take advantage of product information already maintained by the seller's business information management system 120.

Figure 3A:
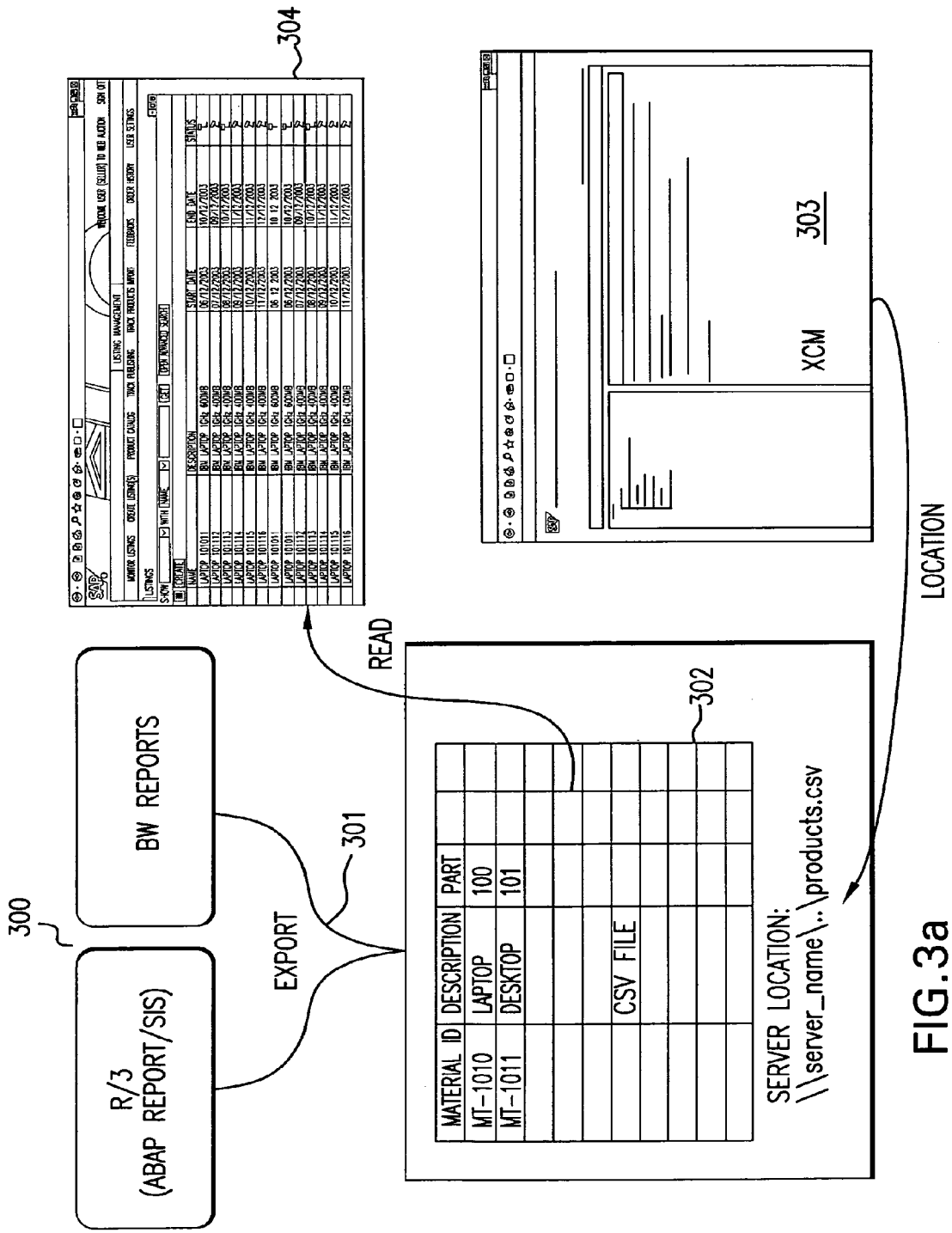
FIG. 3a is a diagram illustrating the product identification process according to one embodiment of the present invention.

FIG. 3a is a diagram illustrating the product identification process according to one embodiment of the present invention. A report, query, or legacy software application 300 can be used as the source of the product information. The information from the source is extracted 301 into a file 302 such as, for example, a file in CSV (comma-separated value) format (i.e., a Microsoft® Excel recognizable format). The file 302 is loaded into the auction application 304 using an auction application configuration management (XCM) 303 setting that specifies the location of the file 302. As an alternative to this embodiment, product information may also be entered manually through the seller interface 103. In another embodiment, a product catalog may be used in the product identification process 201. For example, a product catalog maintained by the business information management system 120 and available through the ISA framework may also be used to identify the product(s) for a listing.

In addition to identifying the product(s) to be auctioned or posted-for-sale, the first step 201 in the enhanced network-based auction process may further involve the gathering of information about the product(s)—the staging of the product(s). According to one embodiment of the present invention, information regarding the product(s) is gathered in a staging area, which serves as the virtual repository of the product information. The staging area may be a memory-based area from which a seller 106 may organize listings or it may be part of a database 117 in the auction application 100 where additional product information may be stored. The additional product information may also be provided as either part of the product identification process discussed above or separately using the same means: 1) manual entry, 2) loading from an external file, and/or 3) from information available in the business information management system 120 such as, for example, from a product catalog. The product information may, in one example, include a product ID, quantity, description, plant, storage location, and shipping point in order to fully identify the specific product so that it can be reserved (discussed later). Less information may be used where only a quantity of a product at a location needs to be reserved but not the specific product or where a product location is not used.

Listing Processing:

The listing processing itself is the second step 202 in the enhanced network-based auction process according to one embodiment of the present invention. From a sales perspective, all the products and materials ("products") identified for auctioning or posting-for-sale are conceptually or electronically gathered in the staging area as previously discussed (e.g., in an auction application 100 database 117). These products can now be grouped into listings that will be published on and executed by the Web auction service 108. Each grouping may be termed a "listing" and each listing may be for an auction or a direct offer for sale (a posting-for-sale).

The listing information is taken from the product information gathered in the staging area as previously discussed and may be augmented with additional listing-specific information provided by the seller 106. For example, a quantity of the product to the offered, an auction start price, an auction reserve price, and a sale price for a posting-for-sale are all examples of listing-specific information that may be provided by the seller 106. Alternatively, this information may be generated or automatically determined based on prior sales history and other information available in/to the business information management system 120. The seller 106 may create one or more listings and he/she determines which products are included in each listing. Products may be listed individually or as a group and, therefore, multiple different products may be included in a single listing if the seller 106 chooses. In addition to the product information, the seller 106 may need to provide information required by the Web auction service 108 in order to place (i.e., publish) the listing. The Web auction service 108 may require or allow the specification of additional information that may not be necessary but may facilitate finding bidders/buyers 105 for the listing and the seller 106 may also include this information. For example, category information for the listing may not be necessary but may help a bidder/buyer 105 find the listing on the Web auction service 108 and therefore would be advantageous for the seller 106 to include in the listing.

Figure 3B:
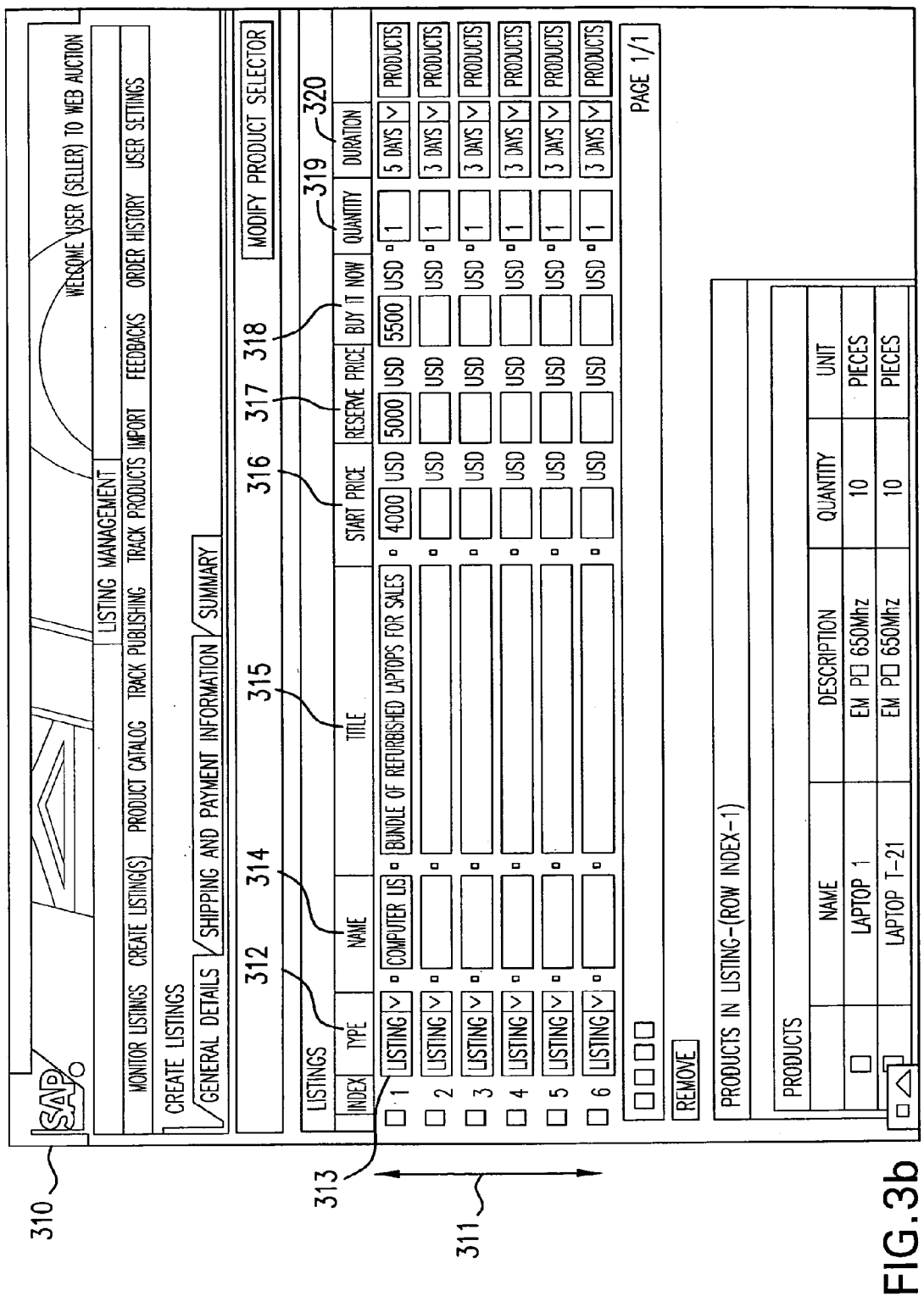
FIG. 3b is a diagram illustrating a computer graphical user interface (GUI) for creating a listing according to one embodiment of the present invention.
Figure 3C:
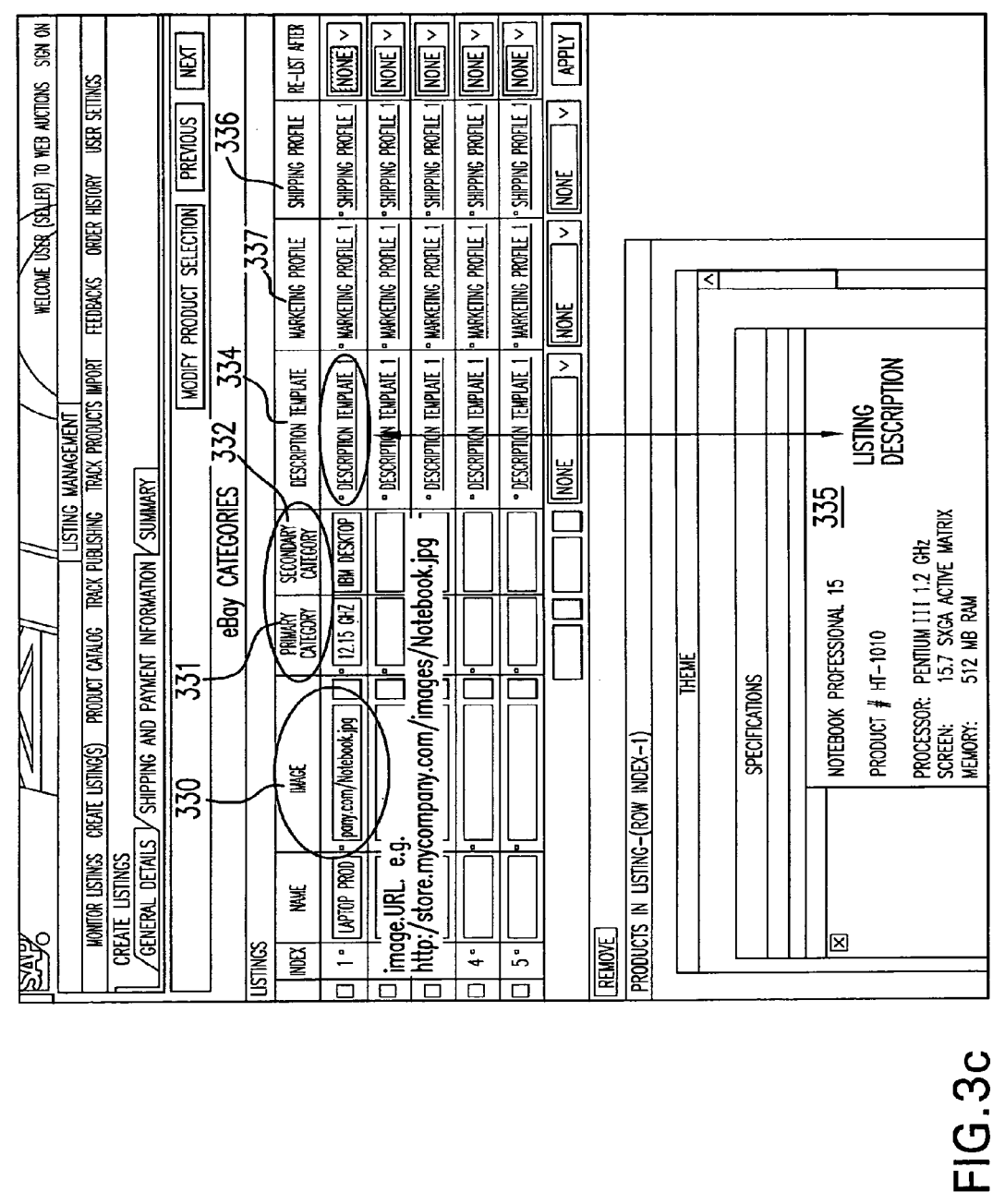

FIG. 3b is a diagram illustrating a computer graphical user interface (GUI) for creating a listing in a Web auction service according to one embodiment of the present invention. In the embodiment depicted in FIG. 3b, the auction application 100 seller interface 103 includes a "create listing" screen 310 allowing a seller 106 to create a listing. This screen may be provided as part of the create listing function of the listing manager 135 in the business object layer 118. This screen shows multiple potential listings 311 that can each be identified by the listing type 312. For example, an auction listing may be of the default type "listing" 313 as shown in FIG. 3b. In addition, a listing name 314 may be provided along with a listing description 315 that may be used by the seller 106 and the Web auction service 108 to help identify and categorize the listing. Additional examples of listing information include a start price 316, a reserve price 317, sale or "Buy It Now" price (for an offer directly for sale) 318, quantity 319, and closing date or listing duration 320. In addition to the general listing details, additional listing information may be provided. FIG. 3c is a diagram illustrating the specification of listing information in the seller interface of the auction application according to one embodiment of the present invention. An image of the product(s) may also be included in the listing according to this embodiment and is specified by the full path and file name of the image 330 in the seller interface 103. A Web auction service 108 may also use categories to help bidder/buyers find listings. In the embodiment depicted in FIG. 3c, the seller interface 103 allows the seller 106 to specify a primary category 331 and a secondary category 332 for the listing. A description template 334 allows the seller 106 to include a description template 335 for the product which can be included in the listing on the Web auction service 108. A marketing profile 337 is used by a seller 106 to improve the visibility of the listing. A shipping profile 336 may provide shipping details (e.g., shipping instructions and/or cost of shipping) for the listing. Several of the fields in the create listing form lend themselves to the use of templates (either for the field itself or for the listing as a whole) which can be stored and reused in future listings. This facilitates the listing process for the seller 106. Information specific to the product, such as its location, may also be provided to facilitate the reservation of the product quantity and to assist in order generation. The quotation/reservation specific information does not need to be sent to the Web auction service 108 though it may be stored by the auction application 100 in a database 117 and used to generate the order in the business information management system 120.

The created listings may be stored in a database 117 in or linked to the auction application 100. The products in the listing may also be linked to a product catalog or other descriptive information in one or more databases of the business information management system 120. The seller 106 may then transfer the listings, once created, to the Web auction service 108. The auction application 100 communicates with the Web auction service 108 (e.g., transferring listings) by sending Web auction service 108 API calls through the Web auction service communicator 113, 134 as previously described. The publication of a listing may occur immediately or may be scheduled for a particular time by the seller 106. For example, a seller 106 may specify as a default that all listings are immediately published to the Web auction service 108 upon successfully creating the listing. The seller 106 may rely on this default or may by exception schedule a listing for a future publication date on the Web auction service 108. Additionally, a seller may specify parameters regarding the re-posting of a listing should the listing unsuccessfully conclude.

Figure 3D:
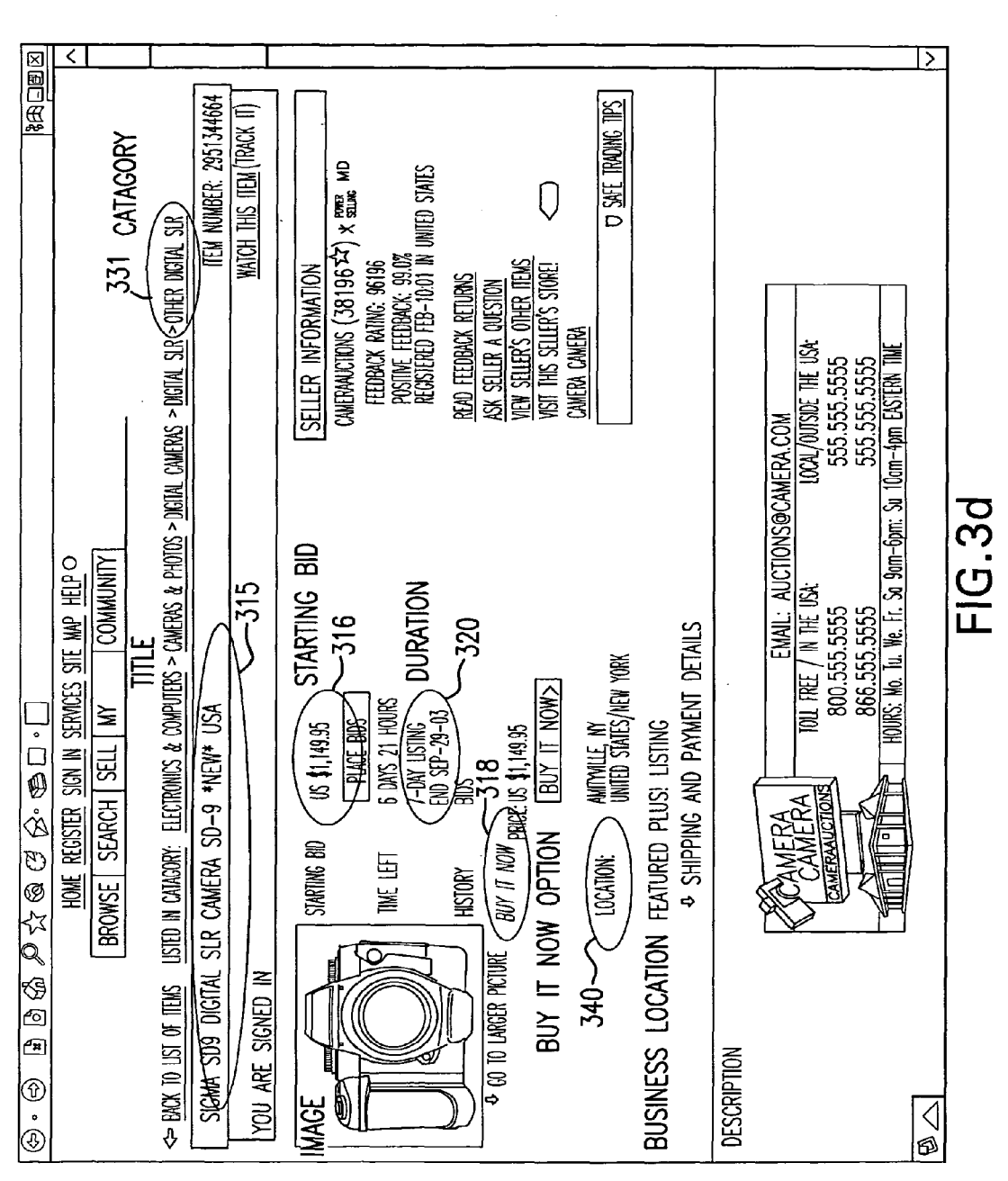
Figure 3E:
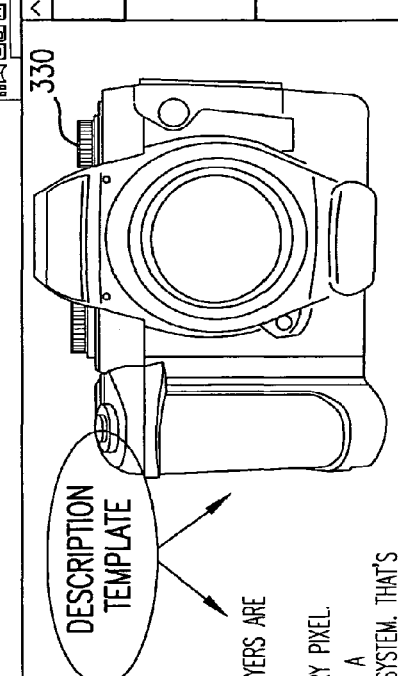
FIG. 3e is a diagram further illustrating a listing published on a Web auction service using seller provided information from the auction application according to one embodiment of the present invention.
Figure 3F:
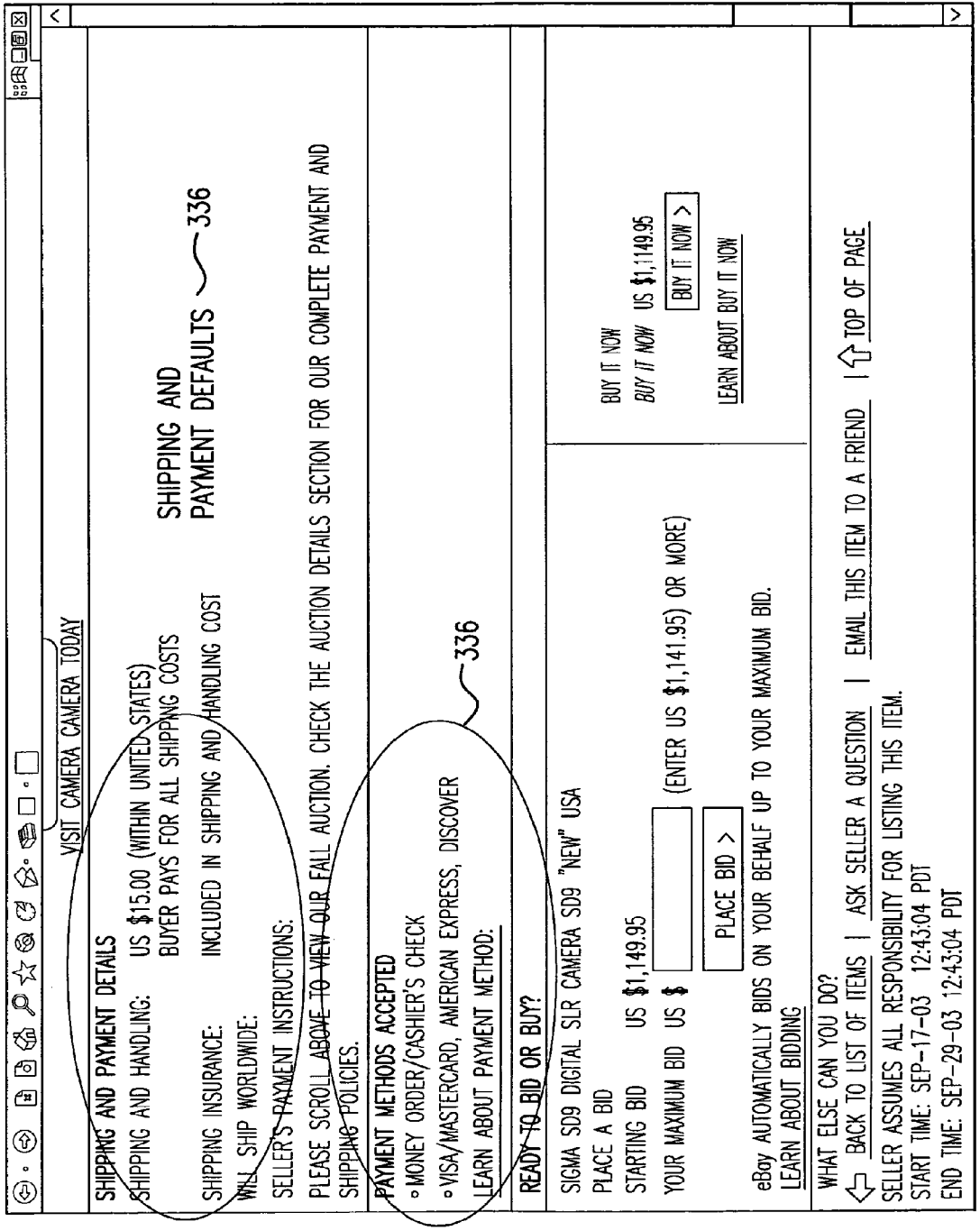
FIG. 3f is a diagram illustrating the incorporation of shipping and payment information in a listing from a seller-defined shipping profile according to one embodiment of the present invention.

FIG. 3d is a diagram illustrating a listing published on a Web auction service according to one embodiment of the present invention. The information provided by the seller 106 is used to generate the published listing as it appears on the Web auction service 108 by sending the Web auction service 108 API calls through the Web auction service communicator 113, 134. For example, the title of the listing 315, category for the listing 331, starting bid 316, duration of the listing 320, "Buy It Now" sale price 318, and location of the product may all be included in the published listing from information provided by the seller 106 and shown in FIGS. 3b and 3c. FIG. 3e is a diagram further illustrating a listing published on a Web auction service using seller provided information from the auction application according to one embodiment of the present invention. The product image 330 specified by the seller 106 and the description from the description template 335 provide potential bidders/buyers 105 with detailed product information. Using this information as a template allows a seller 106 to rapidly generate further listings for similar products. FIG. 3f is a diagram illustrating the incorporation of shipping and payment information in a listing from a seller-defined shipping profile according to one embodiment of the present invention. A shipping profile 336 is like a template in generating default shipping and payment details. The auction application 100 may allow a seller 106 to generate several different profiles from which a seller may select one or the seller rely upon a default profile when generating listings.

In addition to creating a listing as discussed above, a seller 106 may also save the listing, in its entirety or partially, as a listing template which can be used in the future to create new listings. A seller 106 can then decide whether to create a new listing from scratch, use a current or prior listing, or use an existing listing template. If the seller 106 uses a listing template, all the information in the listing template is used to populate the listing fields with the seller 106 still capable of editing the information therein before publishing the listing. A listing may also be created by copying an existing or old listing. For example, a seller 106 may search through existing (i.e., currently in progress or waiting to be scheduled) listings and/or old listings (i.e., listings that have already closed) and select a listing to copy. The information from the copied listing is then used to populate the listing fields for the new listing with the seller 106 still capable of editing the information therein before publishing the new listing. Copying a listing is similar to creating a listing from a template except that an already specified listing rather than a template is used.

Once a listing is created, it can be scheduled for publication or sent to the Web auction service 108 for immediate publication. Before this occurs, the business information management system 120 is queried to validate if the product(s) are available. If the products are not available, the seller 106 is presented with an error message in the seller interface 103. Otherwise, the product(s) are reserved by, for example, generating a reservation for the product(s) in the business information management system 120—also referred to as generating a quotation for the product(s). The reservation is not complete but is used as a placeholder along with the listing information in order to prevent the product(s) from being otherwise disposed. The plant and location information for the product(s) gathered in the staging area may be used to implement the reservation or quotation for the product(s) where the product location matters. The product(s) may be reserved at any time during the listing process but most likely will be reserved when the listing is first created or when the listing is published to the Web auction service. Alternatively, product(s) may be reserved when a listing is activated on the Web auction service 108 (provided the Web auction service allows inactive listings) or when the information for the product(s) is first brought into the staging area. Alternatively, products may never be reserved. The Web auction service 108 handles the execution of the listing and the taking and validating of bids and offers according to the example embodiment though, alternatively, a portion of this process may be handled by the auction application 100.

Post-Listing Processing:

Post-listing processing 203 is the third step in the enhanced network-based auction process and occurs after the listing processing 202 as a result of the conclusion of an auction or posting-for-sale (i.e., a listing). Information may be pulled (i.e., retrieved) from the Web auction service. 108 by the auction application 100 as one method of retrieving winner or other listing information. A Web auction service 108 may also push (i.e., send on its own accord) listing information to the auction application 100. A listing may be concluded automatically through the completion of the listing processing or manually through the early termination of the listing by the seller 106. A seller 106 may manually terminate an auction, for example, when he/she determines there is insufficient interest for the product(s) or when he/she receives a desirable offer and no longer wants to wait for a later planned conclusion to the auction or posting-for-sale. A seller 106 may manually terminate a listing for a number of reasons with the manual termination generally representing a departure from the planned closing conditions.

The automatic conclusion for a posting-for-sale may occur by a particular date and time (i.e., an offer end date) or when the product(s) are purchased. On the other hand, the automatic conclusion of an auction generally occurs at particular date and time advertised by the Web auction service 108 for the auction. However, an auction may be closed under other circumstances. For example, an auction may conclude when a particular price target is met. A posting-for-sale generally concludes when an order is placed for the specified price or when a conclusion date is reached. In one embodiment of the present invention, the conclusion of the auction or posting-for-sale is only successful if a target price (i.e., reserve price) is met, where specified. For example, if product A is being auctioned with a reserve price of $10.00, a successful closing to the auction only occurs if a valid bid of $10.00 or more is made on the Web auction service 108 by the closing date. As previously discussed, an auction or posting-for-sale may include multiple quantities of a product or set of products. Under these circumstances, the auction or posting-for-sale may be only partially successful when it closes if only a portion of the offered quantity is sold. The Web auction service 108 generally receives and validates the bids and offers and determines successful auction winners or buyers of a posting-for-sale. In alternative embodiments of the present invention, the seller 106 may determine successful auction winners or successful purchases using information provided by the Web auction service 108. The closing of a listing whether manually terminated or closed or automatically closed may also need to conform to the requirements of the Web auction service 108 and may limit the closing options available to the seller 106.

According to the example embodiment of the present invention, a successful conclusion of a listing (e.g., an auction or posting-for-sale) results in the initiation of the checkout process (the winning bidder/buyer finalization process) 203—the post listing processing 203. The checkout process is used to verify the winning bidder/buyer information and to generate the necessary order(s) in the business information management system 120 serving as the backend to the auction application 100. During the checkout process, the winning bidder/buyer 105 (i.e., the customer) verifies the purchase of the item on the Web auction service 108 and the customer 105 may also verify and update delivery and payment information.

The checkout process may be conducted through the Web auction service 108 or directly between the winning bidder/buyer 105 and the auction application 100 (the seller 106). In one embodiment of the present invention, the checkout process is conducted through the Web auction service 108. This embodiment may be used when, for example, the seller 106 wants to leverage the Web auction service 108 infrastructure or when the seller 106 wants to remain anonymous. For example, if a seller 106 has limited network-based (e.g., Internet-based) presence and capability to handle the transaction, the seller 106 may want to leverage the infrastructure provided by the Web auction service 108. In another example, if the seller 106 is a brand-name manufacturer disposing of excess inventory, the seller 106 may not want bidders/buyers 105 to know that its name-brand products can be purchased on the Web auction service 108 at a potentially discounted price. Notification is the first step in the Web auction service-based checkout process. A winning bidder 105 may receive an email notification from the Web auction service 108 informing him/her that he/she has won the auction listing. For a posting-for-sale, the buyer 105 may be immediately informed that he/she has successfully executed a purchase when the buyer 105 is online. In either case, the Web auction service 108 may calculate the total checkout amount for the winning bidder/buyer 105 based on the information provided by the seller 106 (e.g., shipping costs) and using the winning bid/purchase price provided by the winning bidder/buyer 105. The seller 106 may also be notified of the winning bidder/buyer 105 by the Web auction service 108.

Figure 4A:
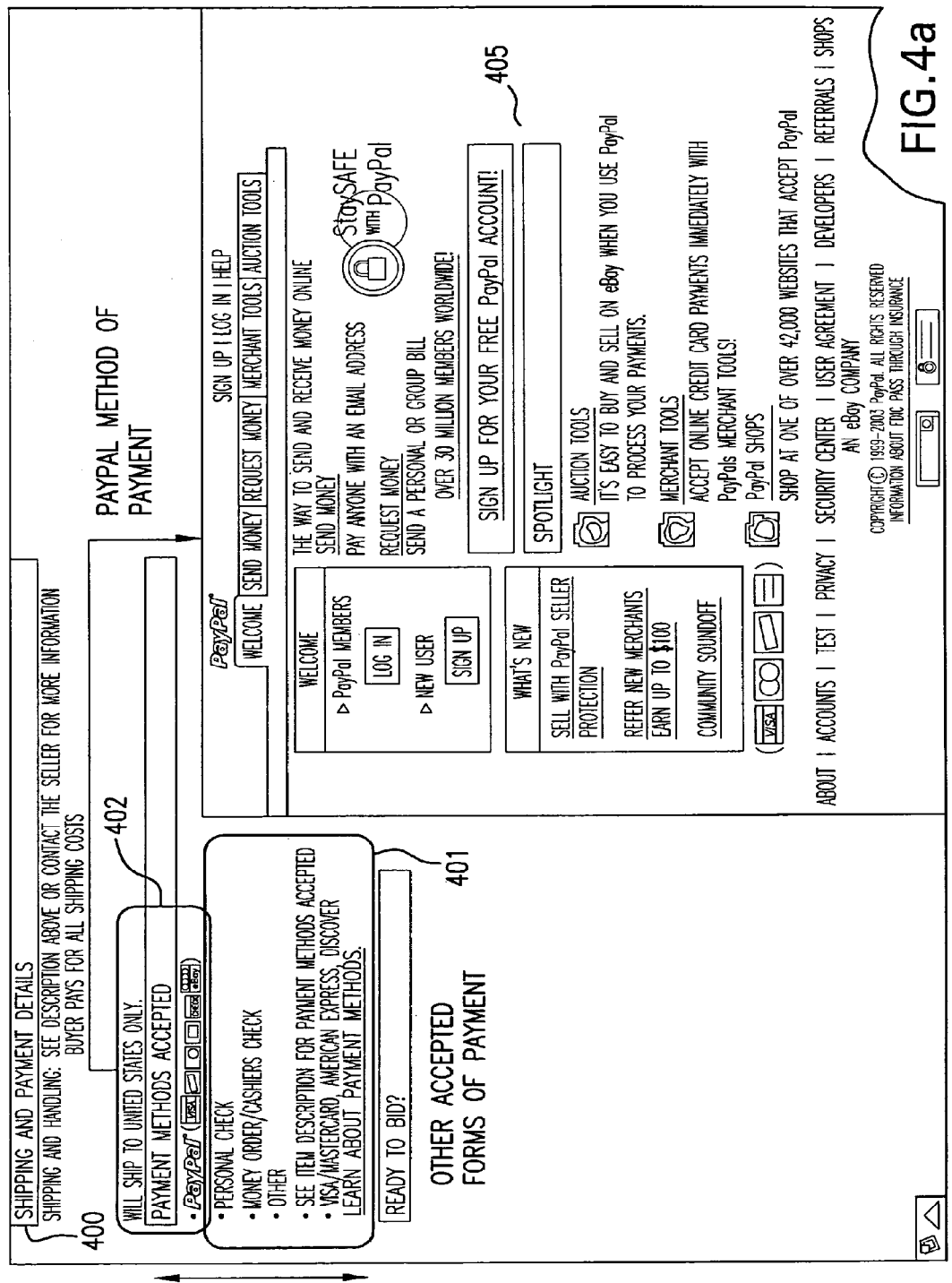
FIG. 4a is a diagram illustrating how forms of payment may be specified in a listing and how selection of one form of payment links a winning bidder/buyer to an appropriate payment site according to one embodiment of the present invention.

The payment method selected by the winning bidder/buyer 105 must conform to acceptable forms of payment 336 identified by the seller 105 and this form of payment dictates the following steps in the checkout process 203. FIG. 4a is a diagram illustrating how forms of payment may be specified in a listing and how selection of one form of payment links a winning bidder/buyer 105 to an appropriate payment site according to one embodiment of the present invention. The payment details 401 may be included in the listing 400 on the Web auction service 108. The form of payment may be linked to an appropriate payment page for the Web auction service 108 or other third party payment provider. For example, selecting PayPal® 402 as the third party payment provider brings the winning bidder/buyer 105 to the PayPal® Web site 405 from which a payment can be made and the checkout process 203 continued. Once the winning bidder/buyer 105 makes the appropriate payment on the PayPal® Web site 405, PayPal® sends an Instant Payment Notification (IPN) message to the seller 106 (to the auction application 100) in the form of an HTTP post message confirming that the winning bidder/buyer 105 has made a payment as part of the checkout process 203. PayPal® is only one example of a third party payment provider and may itself be limited to offering services in only a few countries. Other third party payment providers may also be used. For example, in Germany (where PayPal® is not available), an Iloxx powered Treuhandservice may be used for payment transfers. The winning bidder/buyer 105 makes the necessary payment to Iloxx, which confirms the payment and notifies the seller 106. The Web auction service 108 may also provide its own payment system that may be used by the winning bidder/buyer 105 to make payment as part of the checkout process 203. Under these circumstances, the Web auction service 108 on receipt of payment from the winning bidder/buyer 105 may confirm the payment and send an appropriate notification to the seller 106. The winning bidder/buyer 105 may also make payment arrangements directly with the seller 106 when the seller 106 offers this option. In this scenario, the winning bidder/buyer 105 makes arrangements for the payment and the seller 106 processes the payment on receipt from the winning bidder/buyer 105. In all the cases discussed above, the payment step is generally the second step following notification in the checkout process 203.

Regardless of the form of financial service provider handling the payment for the winner (e.g., a third party payment provider or the Web auction service itself), the payment confirmation may be retrieved (i.e., pulled) by the auction application 100 from the financial service provider through a communication API with the financial service provider and/or the confirmation may be sent (i.e., pushed) from the financial service provider to the auction application 100. Once the confirmation is received, the auction application 100 may make a calculation to determine that the payment made (the actual payment) equals the expected payment from the listing. If there is a mismatch because of either an underpayment or an overpayment, the checkout process is incomplete and a resolution procedure may need to be executed. This resolution procedure may involve a manual resolution to the overpayment/underpayment.

In another embodiment of the present invention, the checkout process 203 is conducted between the winning bidder/buyer 105 and the seller 106 through the auction application 100. This embodiment may be used when a seller 166 wants to leverage its own network-based (e.g., Internet-based) sales architecture and/or when the seller 106 wants to drive traffic to his/her own network-based (e.g., Web) site to potentially generate additional sales. The notification step differs slightly in that in addition to the notification by the Web auction service 108, the seller 106 may send a notification message (e.g., an email) to the winning bidder/buyer 105 referencing the checkout process for the listing. The seller 106 provided notification may expedite the checkout process 203 by including a URL with a secure ID for a checkout Web page (or other network-based site) that is particular to the listing and the winning bidder/buyer 105. For example, if the winning bidder/buyer 105 is not already a customer of the seller 106 and is not registered with the seller 106, a random secure ID may be used as part of the URL linking the winning bidder/buyer 105 with either a registration Web page (if the winning bidder/buyer 105 information is to be stored for future use) or to a checkout Web page (where the winning bidder/buyer 105 information will be used for a one-time transaction). The fields of the checkout Web page may be pre-populated with information from the listing and the Web auction service 108. If the winning bidder/buyer 105 is already a registered customer of the seller 106, a login page may be presented separately or a login required as part of a checkout Web page where fields are pre-populated as discussed above.

Figure 4C:
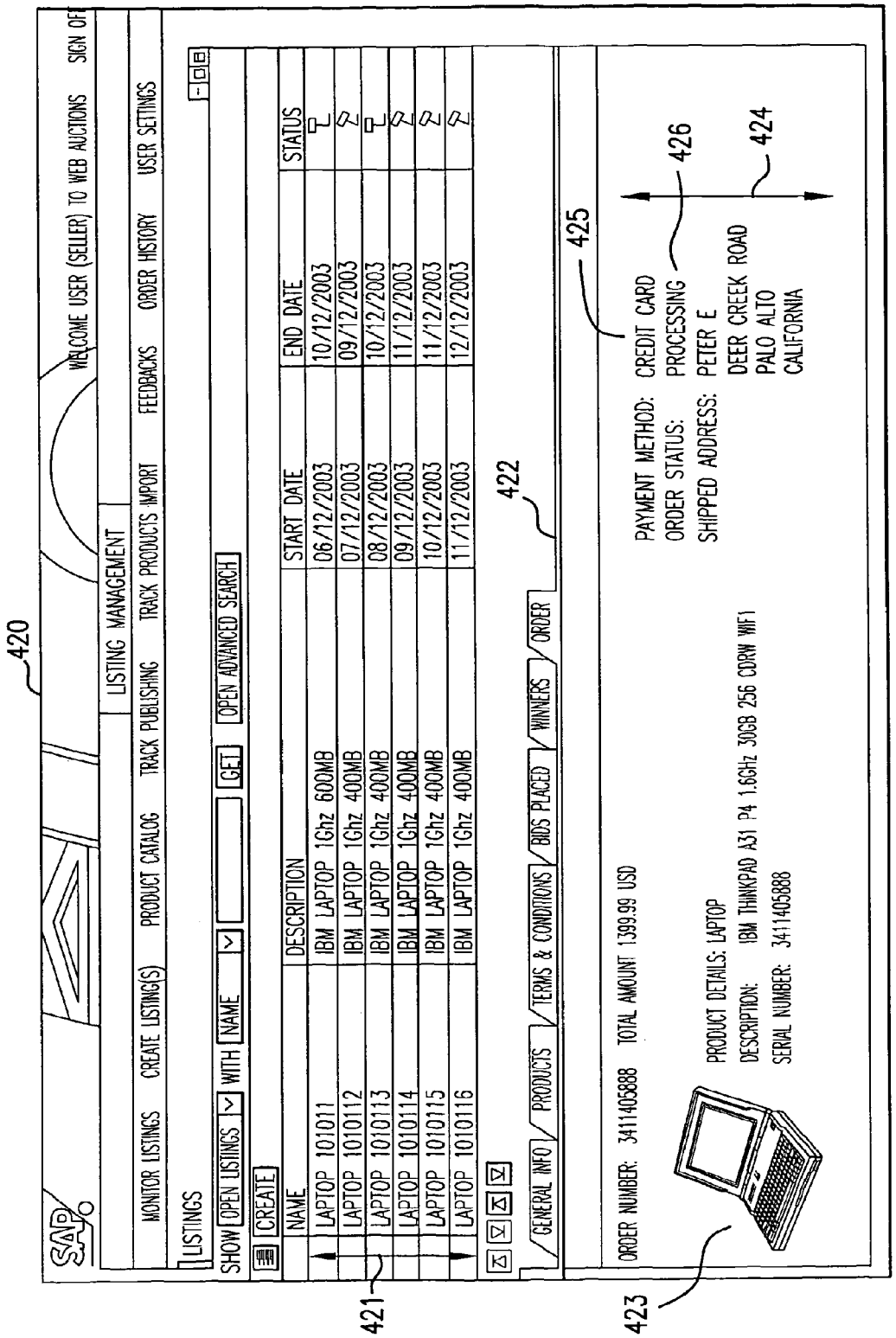
FIG. 4c is a diagram illustrating a listing in the process of checkout in a sample listing management screen as part of the seller interface according to one embodiment of the present invention.

FIG. 4b is a diagram illustrating a sample checkout Web page for a seller site (auction application) run checkout process according to one embodiment of the present invention. The checkout Web page 410 shown already assumes a winning bidder/buyer 105 has already logged in and can log off 411 at any time. A description of the listing 412 and details of the products in the listing 413 are shown along with a total cost 414 computed for the winning bidder/buyer 105 by the auction application 100 (i.e., the seller site). In addition, the winning bidder/buyer-specified billing information 416 and shipping information (not shown) along with payment information 415 is presented allowing the winning bidder/buyer 105 to review this information before providing it to the seller 106. FIG. 4c is a diagram illustrating a listing in the process of checkout in a sample listing management screen as part of the seller interface 103 according to one embodiment of the present invention. The listing management screen 420 may allow a seller 106 the ability to track information regarding all his/her finalized listings 421. Finalized listings 421 are shown in the listing management screen 420 with order information 423 specific to a selected listing shown in a tab 422 of the bottom pane of the screen 420. The payment information for the order 424 indicates that a payment by credit card 425 has been made and that it is still being processed 426.

The payment step is handled by the auction application 100 (i.e., the seller site) according to this embodiment of the present invention. The auction application 100 may allow for direct payments or may use third party payment providers such as PayPal® and the Treuhandservice by Iloxx as discussed above. The auction application 100 may be configured to directly accept credit card payments requiring credit card processing to be provided in the auction application 100 or through the backend business information management system 120 either of which may need to communicate with an external clearinghouse to process the transactions. The auction application 100 may also allow cash or cash equivalent payments to be made in any technically feasible form. For example, the winning bidder/buyer 105 may authorize a wire or electronic cash transaction by providing his/her bank account and bank routing information to the seller 106 along with any necessary transaction authorization allowing the auction application 100 to generate an electronic transfer for the winning bidder's/buyer's credit. In another example, the auction application 100 may prompt (e.g., online or by sending a bill or invoice either electronically and/or by hardcopy) the winning bidder/buyer 105 to submit a check or money order in response to a winning bidder's/buyer's 105 request to make a cash payment.

In one embodiment of the present invention, the auction application 100 may be configured to add the winning bidder/buyer 105 as a new customer (i.e., business partner) in the business information management system 120. For example, the winning bidder/buyer 105 and his/her associated information are added to the appropriate customer and other associated tables of the backend business information management system 120 creating a new customer master record. In particular, a unique customer (business partner) identifier is assigned to the new customer and it is linked (i.e., mapped) to a Web auction service identifier for the customer (e.g., in a lookup table or using associated key fields in a table) in the business information management system 120. According to this embodiment, the auction application 100 compares the winning bidder/buyer information with existing customer information in the business information management system 120. For example, the business information management system 120 is searched using the Web auction service identifier for the winning bidder/buyer 105. If the customer entry already exists, customer specific information may be retrieved and presented during the checkout process 203. For example, a winning bidder/buyer 105 may be presented with shipping address, payment information, etc. based on the information stored in the business information management system 120. The winning bidder/buyer 105 may then continue with this default information or may edit the appropriate entries and submit the necessary information. If the customer entry does not already exist, customer information may be added to the business information management system 120 as part of the checkout process 203. The mapping of a customer identifier to the Web auction service customer identifier in the business information management system 120 allows rapid searching for existing customers and prevents duplicating entries for the same customer.

In an alternative embodiment of the present invention, the checkout process 203 is executed without saving the customer information in the business information management system 203—without creating a new customer entry or new customer master record. The customer information is still necessary as part of the checkout process 203, however, the customer information is not stored in a manner allowing it to be reused in further checkout processes. In this situation, one-time customer data may be stored in the information for the order but is not used to generate specific customer information separate from the order.

Regardless of whether a new customer entry is created in the business information management system 120 (i.e., a new customer master record is created), an order needs to be created for each winning bidder/buyer 105 of a listing. The order is created primarily using the original listing information with additional information provide by the Web auction service 108 (e.g., winning bid or purchase price). A reservation may already have been created when the listing was first generated or published as part of a quotation of the quantity in the listing and, in this case, additional details may need to be added for the reservation. The pricing information for the order may include an overall price or may be broken down by product in multi-product listings. In addition, tax and shipping fees along with other fees may also need to be calculated and included in the order. This additional information may be provided by the Web auction service 108, calculated by the auction application 100, or may need to be generated or manually entered for the order. Shipping costs are normally included in the listing by: including a flat fee for shipping regardless of shipping destination within the region the seller 106 will ship to; the use of a Web auction service 108 shipping calculator to estimate shipping costs; or by not specifying the cost in the listing but specifying the shipping cost based on a selected delivery method during the checkout process (i.e., allowing the winning bidder/buyer 105 to select one of several shipping options during the checkout process 203). In any case, the order may need to allow for automatic and/or manual determination of shipping costs to handle the various possibilities. Tax costs may need to allow for the inclusion of U.S. sales taxes along with foreign value added taxes (VAT) such as the German Mehrwertsteuer (VAT). The auction application 100 and/or the business information management system 120 may include the integration of external tax packages such as those of Vertex, Inc. and Taxware to support these tax calculations. The total costs of the order are presented to the winning bidder/buyer 105 as previously discussed prior to the payment step in the checkout process 203. A delivery block (i.e., blocking the delivery of the product(s)) may be placed on the order until proper payment is received.

The delivery step generally occurs after payment is made (the payment step) regardless of whether checkout occurs on the Web auction service 108 or through the auction application 100 (i.e., the seller site) according to the example embodiment. The product(s) are generally reserved when the listing is either first created, published, or activated on the Web auction service 108. The reservation of the product(s) may include the specification of the product(s) by location through the use of location specific fields such as plant, storage location, and/or shipping point in a warehousing or plant specific module of the business information management system 120. For example, the Warehouse Management (WM) module of the SAP® R/3® system may be used. After any delivery blocks are removed when payments are received, the product(s) are shipped according to the shipping method and to the shipping address as verified during the checkout process 203. A winning bidder/buyer 105 may be able, through the winning bidder/buyer interface 104, to check on the status of the order to include the shipping status if carrier tracking is provided by the business information management system 120. For example, SAP® Express Carrier configuration in the SAP® Internet Sales Architecture running on R/3® can provide detailed tracking of an order by handling units. In an alternative embodiment, delivery may be made before payment is received such as during payment processing or when selling on credit (i.e., an internal seller credit) to a winning bidder/buyer.

Other steps in the checkout process 203 may include updating general accounting and financial information for the seller 106 based on a delivered and paid order. Additionally, the payment of fees to other external service providers may be necessary and may also need to be calculated and paid. For example, the Web auction service 108 will typically charge a fee for the listing which the seller 106 will need to pay if not already paid in advance. Additionally, the use of an external clearing house for a credit card order, PayPal®, and the Iloxx run Treuhandservice may also need to be paid for by the seller 106 as appropriate. The billing of these fees may or may not be automated and may occur outside the immediate checkout process between the winning bidder/buyer 105 and the seller 106. Alternatively, the payment of these fees may be required in conjunction with the checkout process 203. For example, the Web auction service 108 fee may need to be paid as part of the checkout process 203.

Feedback:

A Web auction service 108 may allow a winning bidder/buyer 105 to leave feedback regarding a seller 106 and for a seller 106 to leave feedback regarding the winning bidder/buyer 105 on the Web auction service 108. The auction application 100 as part of its scheduled processes may retrieve feedback left by winning bidders/buyers 105 regarding the seller 106. This information may then become available to the seller as part of the monitoring and analyzing process 204 discussed below. In addition, the seller 106 may generate and leave feedback with the Web auction service 108 regarding the winning bidder/buyer 105. This feedback may also be stored by the auction application 100 either in a database 117 or in the business information management system 120 along with the customer information so that it is available for future use. The seller feedback available on the Web auction service 108 may be used by other bidders/buyers 105 when deciding whether to bid on or to make a purchase from a seller's listings. In a similar manner, bidder/buyer feedback available on the Web auction service 108 may be used by other sellers in determining what forms of payment to accept and whether to accept the bids/offers of a bidder/buyer 105.

Monitoring And Analyzing Listings:

The fourth step in the enhanced network-based auction process is the monitoring and analyzing of listings 204 according to one embodiment of the present invention. The monitoring and analyzing of listings 204 may occur in parallel throughout the entire process and is not sequentially dependent on any of the other steps in the process as outlined. As the name implies, the monitoring and analyzing step 204 allows a seller to both monitor listings and perform analysis on the listings through the seller interface 103 of the auction application 100. The seller interface 103 may allow the seller 106 the ability to monitor listings according to a number of parameters. For example, the seller 106 may view all his/her listings, only published listings, closed listings, etc. FIG. 5a is a diagram illustrating a seller interface display allowing a seller to monitor his/her listings according to one embodiment of the present invention. The monitoring screen 500 allows the seller 106 to view particular types of listings 501, in this case "failed to publish" listings. The seller 106 may also conduct a search 502 and may specify the field 503 by which the listings are sorted or displayed. In this case, the listings are those that have "failed to publish" 501 and are organized by listing name 504. A listing title 505 and scheduled publication date 506 are also included along with the listing status 507—in this case "Errors" for the listings that have failed to publish. Clicking on the error field 507 (i.e., the status field) allows the seller 106 to display details 508 about the listing that have caused the particular status. Regarding the selected listing shown, the error causing the failure to publish the listing is the inability to reserve the product selected for the listing. As previously stated, reserving the product or creating a quotation may occur to ensure that the product isn't otherwise disposed of, as this case shown in FIG. 5a indicates. Additional listing information may also be available through the monitoring display. For example, other listing details, highest bidder information, and bidder information may also be available from information in the auction application 100, database 117, or downloaded (retrieved) from the Web auction service 108 through a scheduled process as previously discussed.

Figure 5B:
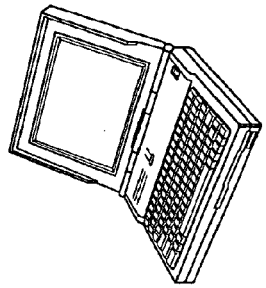
FIG. 5b is a diagram illustrating a seller interface display allowing a seller to search his/her listings as part of the monitoring process according to one embodiment of the present invention.
Figure 5C:
FIG. 5c is a diagram illustrating the advanced search designation screen of the seller interface according to one embodiment of the present invention.

As shown in FIG. 5a, a seller 106 may be able to conduct a search of his/her listings limiting the information displayed and facilitating the monitoring process. FIG. 5b is a diagram illustrating a seller interface display allowing a seller to search his/her listings as part of the monitoring process according to one embodiment of the present invention. The display screen 510 shows a basic search returning a group of listings organized and sorted by listing name 504. The basic search field 511 allows a seller 106 to view open listings, active listings, finalized listings, and closed listings according the example depicted in FIG. 5b but does not have to be limited in this manner. The listings are also sorted by name 512 as they were in FIG. 5a. In addition, a search term "Laptop1" 513 is used to limit the returned listings to those containing a "Laptop1" product. In addition to the listing description 505 and status 507, the start date 515 and end date 517 for the listings are also displayed. Selecting a listing by clicking on the name 504 may result in the display of the product details 517 for the listing according the example depicted in FIG. 5b. A seller 106 may also be provided the option to conduct an advanced search 514 if the basic search is not sufficient. FIG. 5c is a diagram illustrating the advanced search designation screen of the seller interface according to one embodiment of the present invention. The advanced search screen 520 allows the seller 106 to specify more detailed search parameters including a listing name 521 and a product name 524 for which wild cards may be used in the name specification. A start date range 522 and an end date range 523 for the listing search may also be specified as well as selecting listings by those for which a reserve price 525 and those with an automatic bid increment 526 are included. FIG. 5c is only one example and different and/or more detailed advanced searching options may be presented to the seller 106.

In addition to searching listings and viewing their status, current listing information may also be viewed by the seller 106 as part of the monitoring process 204. FIG. 5d is a diagram illustrating the viewing of bidding information for an auction listing according to one embodiment of the present invention. For a selected listing in the search screen, bidding information 531 can be viewed by selecting a "Bids Placed" tab 532 according to example depicted in FIG. 5d. The bids specify the bidder 533 but are organized by the latest bid placed according to the time of the bid 534 and include the bid amount 535. Other listing information may also be displayed including, for example, a start price 537, a specified reserve price 536, and a bid increment 538 if one is specified. FIG. 5d is an example of the Web auction service 108 data that can be periodically retrieved by scheduled process, copied to the auction application 100, and made available to the seller 106 as part of the monitoring and analyzing process 204.

In addition to the monitoring functions described above, the seller interface 103 may also provide analysis such as tracking statistics based on a listing history of the seller. A seller may be provided an interface to generate reports based on seller specified listing parameters with the reports generated using data from the seller's listing history. These reports can determine, for example, overall profitability of listings, listing success rates, product demand, demand-to-price analyses, and location based demand analyses. According to one embodiment of the present invention, the analytical reporting available through the seller interface 103 of the auction application 100 may be provided using the SAP® BW reporting tool. Examples of analytical statistics that may be collected/tracked and made available to a seller may include the top n successfully/unsuccessfully closed listings based on either revenue generated and/or time period. According to this example, analytical information regarding the amount of revenue generated or revenue that could have been earned (but failed to earn due to unsuccessful listings) over a certain period of time may be provided. The presentation or selection of this information may be further refined according to a seller's business unit/department/division or other such grouping categories. In addition to listing revenues and listings over time, other examples of analytical information may include information for relistings (reposted listings), the most listed categories and/or products, the most failed listings by category and/or product, the number of relistings by category and/or product, the return on investment per listing, etc. The above examples make apparent that a wide variety of analytical information and statistics may be tracked and made available to a seller according to this embodiment of the present invention.

Alternative embodiments of the present invention may provide additional or alternative features to those described above. In an alternative embodiment, the seller interface 103 may include a personalized homepage that may have a different login for each user and/or role. When a user (for instance seller 106) logs in, information may be provided showing tasks and listing status for the seller. The personalized homepage may be viewed and/or accessed from the SAP® R/3® or CRM seller side or elsewhere, and may provide information by default such as, for example, current listings, listings scheduled to be published, and recently closed listings. Prior listings may also be republished using the personalized homepage.

The personalized homepage may allow for customized name searches, and may be used with a system such as an SAP® ERP (Enterprise Resource Planning) system or SAP® R/3®. The personalized homepage may provide the user with highlights of the listing information and may grab information (in particular, user-requested information) from a backend system such as the business information management system 120.

For example, if a holiday is approaching, a seller may schedule now (in advance) to publish to the Web auction service 108 on the holiday. When the seller logs in, a list of what will be published and what has been published may be displayed, as well as any problems with either of the published listings or the yet-to-be published listings. This information may be displayed in a predefined field or, alternatively, may be time-dependent information. For time-dependent information, specific criteria may be defined and set-up. A user may create a login script or scenario including as many fields as may be included in a query, which may run each time the user logs in. The user may also name particular searches and save a set of searches accessible from the personalized homepage. A user may edit the personalized homepage to show only what they wish to view, for example, a list of auction items sold.

One example method for performing the personalization process may include making an advanced query with different fields. The different fields may include product name, status of listing, publication status (including closed and checked out), and published in a certain date range. The backend system (e.g., SAP® R/3® or other ERP system) may receive the queries though hyperlinks which a seller may click on in the personalized homepage causing a query to execute on the backend system with the query results being displayed to the user. These queries may be saved to the system (as part of the hyperlink or otherwise) and may be executed when the user logs in. Clicking a hyperlink may result in the display of specific information relating to the listings satisfying the query. Queries may be named to allow the user to execute any number of queries. The queries results may include more detailed information on the products in the listing as well.

The personalized homepage may be set up using the business information management system 120, for instance an SAP® R/3® system or SAP® ERP system, or other backed system. The quantity of a product and the number of products that the seller wants to place in the listing may identified in the business information management system 120 (e.g., marking a field) which may then be used in a query in the personalized homepage of the auction application 100. For example, a business warehouse system (for instance, the BW system from SAP®) search may provide such saved information in response to a personalized homepage query. According to this embodiment queries may be predefined or customized by the seller or user in the personalized homepage.

An alert system may also be included using the queries in order to alert the seller as to which products are ready for listing. The resulting query may display the product and other selected listings on a screen before a new listing is generated. The information may be stored in the backend system (e.g., an ERP system, SAP® R/3®, or SAP® BW).

When a user logs into a system, a query may be executed based on a predefined query (which may have been created by the user) with respect to an application status. For example, the query may communicate with a database in the backend of an ERP system.

The query may use links or hyperlinks to communicate with a database for information. This query system may provide a flexible system for a user setting-up a homepage.

Listing Themes:

A seller 106 may also define a listing theme providing a distinct look and feel to the listing of a seller 106 during the listing creation and publishing in the listing processing 202 step in the enhanced network-based auction model. This may help promote brand identity or seller identity by ensuring a consistent look and feel for seller listings on the Web auction service 108. Listing themes may consist of standard HTML with links to images and embedded styles included for the customization in the presentation of a seller's listings. Using embedded links in the HTML requires that the linked images and styles also be available to the Web auction service 108 so that the listing theme can be displayed properly with all its components available. Listing themes may only be implemented where a Web auction service 108 allows seller specified theme information to be displayed.

A listing theme is generally first created in a display language such as HTML using a specific editor (e.g., an HTML editor) or a text editor. This function may be available through the seller interface 103 or the seller may import a document (e.g., an HTML document) created outside the auction application 100. A listing theme may be created in the auction application 100 according to one embodiment of the present invention or, alternatively, may be directly sent to the Web auction service 108, where the Web auction service 108 provides support for such themes. Placeholder sections inside the HTML document indicate areas where substitute text for the listing will be included—listing information will be copied into the placeholder area. Listing themes are composed conceptually as an entire body of HTML, within which various sections of relevant listing information, such as listing description, shipping information, or payment details, reside. Certain sections of the listing information, such as listing description, may vary constantly depending on the product, while others such as shipping information, return policies, and payment information may be relatively static. Conceptually, themes can consist of various static and dynamic page sections that in aggregate compose the actual listing theme. Currently these sections may include the header, sales policy, shipping policy additional information as shown below.

| THEME |
| --- |
| HEADER |
| PRODUCT DESCRIPTION |
| SALESPOLICY |
| SHIPPING POLICY |
| ADDITIONAL INFORMATION |

A listing theme layout generally conforms to the following visual representation according to this embodiment. Listing themes may be stored either as a full HTML document or as an HTML document fragment. A full HTML document would be demarcated with the requisite HTML start and end tags as well as the attending head and body tags. An HTML document fragment would need only the start and end tags of the whole of the fragment to match. The document fragment start and end tags should preferably also be designated block level tags such as table, div or p. An optional embedded style section can also be inserted to the beginning of the document fragment if the seller 106 intends to employ styles for customizing the display. The examples below display both an HTML document and document fragment:

```
<!-- BEGIN HTML DOCUMENT -->
<html>
<head>
<style type="text/css">
a.link      { text-decoration: none !important}
        a.hover     { text-decoration: underline !important}
</style>
</head>
<body>
<table>
        <tr>
        <td><a href"...">...</a></td>
        </tr>
</table>
</body>
</html>
<!-- END HTML DOCUMENT -->
<!-- BEGIN DOCUMENT FRAGMENT -->
<style type="text/css">
        a.link      { text-decoration: none !important}
        a.hover     { text-decoration: underline !important}
</style>
<table>
        <tr>
        <td><a href"...">...</a></td>
        </tr>
</table>
<!-- END DOCUMENT FRAGMENT -->
```

Although the Web auction service 108 may accept both full HTML documents and document fragments, the preferred method is to use document fragments according to this embodiment. Inserting themes as document fragments into a Web auction service 108 listing page normally results in valid HTML. When entire HTML documents are inserted, the result may be a non-valid HTML page because there would be more than one start and end html tags. Depending on how sensitive the bidder/buyer 105 browser is to HTML errors, the effect may lead to an unintentional or undesirable display.

Special tags may be used within listing themes to demarcate placeholders within the HTML, which the auction application 100 or Web auction service 108 will substitute with corresponding field values pertinent to the listing. The format of the placeholder will standardize on syntax derived from the current JSP specification and/or the HTMLb tag service. The placeholder uses a general XML namespace: tag name format. For example, the placeholder for the listing product title may be written as follows:

<h1><sap:product_title/></h1>

In this example, SAP® is the XML namespace and product_title denotes the tagname. Both monikers taken together as the tag represent a placeholder that the auction application 100 or Web auction service 108 will remove and replace with the stored value corresponding to the product title. Other placeholders for the remaining fields will work in a similar manner. The actual listing theme may be composed using a document fragment consisting of an HTML table, the contents of which constitute the theme that will be displayed as part of the listing on the Web auction service 108. Providing a further example, valid HTML code for a listing theme can appear as the following:

```
<!-- START LIST THEME -->
<table cellpadding="0" cellspacing="0">
<tr>
<td>
<h1><sap:product_title/></h1>
```

```
</td>
</tr>
<tr>
<td>
<h1><sap:product_description/></h1>
</td>
</tr>
</table>
<!-- END LIST THEME -->
```

This fragment can be inserted into the Web auction service 108 listing page when the listing is published. The fragment may contain links to images and other resources outside of the Web auction service 108. If this is the case, these linked images and other resources must be made externally available to the Web auction service 108 in order for the listing theme to display correctly. It may be the responsibility of the seller 106 to ensure this occurs as the auction application 100 may not be able to determine these components if the listing themes are not generated in the auction application 100. Note that the starting and ending HTML comments are optional, but desirable for formatting and development purposes. The following is an example of a user-defined tag and template implementation of a listing theme:

```
<!-- BEGIN USER-DEFINED TAG -->
<style type="text/css">
        a.link      { text-decoration: none !important}
        a.hover     { text-decoration: underline !important}
</style>
<table>
        <tr>
        <td><sap:include value="productImage2"/></td>
        </tr>
</table>
<!-- END USER-DEFINED TAG -->
<!-- BEGIN EXAMPLE OF USER-DEFINED TEMPLATE -->
<sap:include value="defaultStyleFragment"/>
<table>
        <tr>
        <td><sap:include value="productImage2"/></td>
        </tr>
</table>
<!-- END EXAMPLE OF USER-DEFINED TEMPLATE -->
```

Persistence:

In one example, the SAP® database (DB) 117 is a software application that works with the J2EE™-based SAP® Web application server used in the example embodiment depicted if FIGS. 1*a*, 1*b*, and 1*c*. SAP® DB may serve as the persistence database for the auction application 100 according to one embodiment of the present invention. In other words, data entries are made to the SAP® DB database 117 in order to ensure the persistence of the data received from and transferred to either the Web auction service 108 or the backend business information management system 120.

Figure 6:
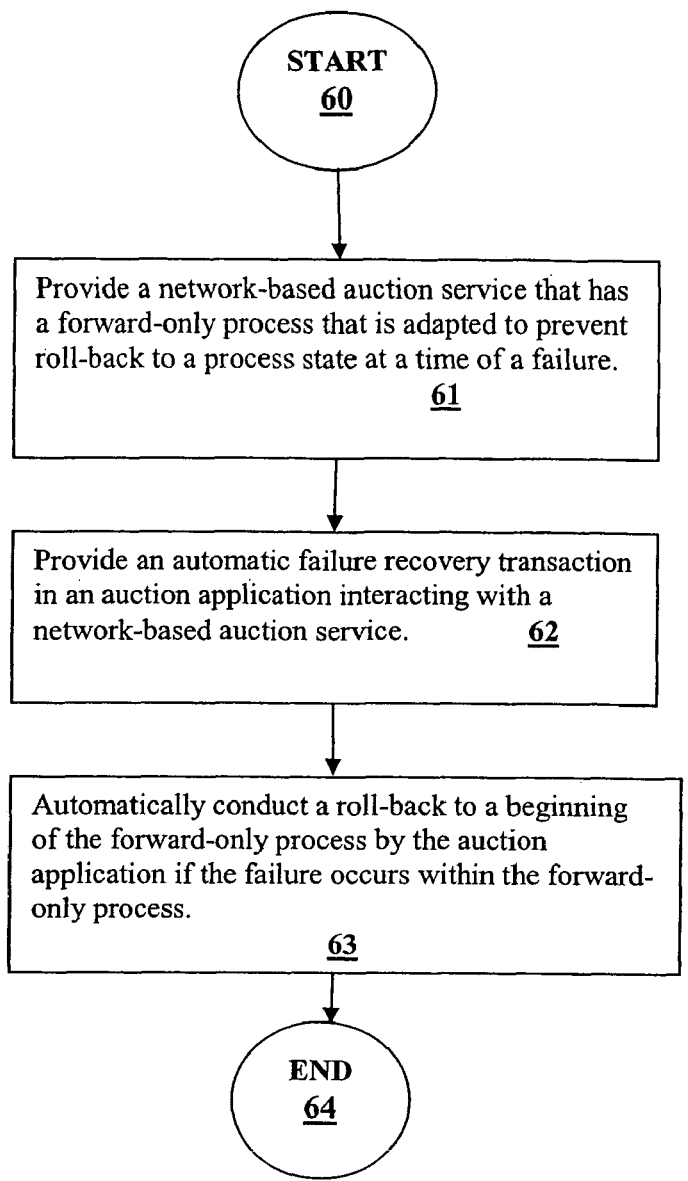
FIG. 6 is a flowchart illustrating an exemplary method according to one embodiment of the present invention.

Method Flowchart:

FIG. 6 is a flowchart illustrating an exemplary method according to one embodiment of the present invention. The flow in FIG. 6 begins in start circle 60 and proceeds to action 61, which indicates to provide a network-based auction service that has a forward-only process that is adapted to prevent roll-back to a process state at a time of a failure. From action 61, the flow proceeds to action 62, which indicates to provide an automatic failure recovery transaction in an auction application interacting with a network-based auction service.

From action 62, the flow proceeds to action 63, which indicates to automatically conduct a roll-back to a beginning of the forward-only process by the auction application if the failure occurs within the forward-only process. From action 63, the flow proceeds to end circle 64.

What is claimed is:

1. A method of failure recovery using an automatic failure recovery transaction, comprising:

provisioning, using a computer processor, a network-based auction service, the network-based auction service having a forward-only process that prevents a roll-back to a process state at a time of a failure and allows forward-only screen prompts;

providing, using the computer processor, a business information management system that contains product to be listed in auctions on the network-based auction service;

providing, using the computer processor, an auction application separate from the network-based auction service, the auction application to integrate the network-based auction service and the business information management system and to provide the automatic failure recovery transaction for the forward-only process of the network-based auction service;

defining, using the computer processor, a plurality of milestones in the automatic failure recovery transaction of the auction application, wherein each milestone is a point in the forward-only process that transaction state information is saved;

providing, using the computer processor, by the network-based auction service, access to the forward-only process to a user;

saving, using the computer processor, entries and responses made by the user, by the auction application, upon completion of each milestone as part of the transaction state information;

after a failure occurs within the forward-only process of the network-based auction service, automatically, using the computer processor conducting a roll-back to a beginning of the forward-only process by the auction application;

automatically inputting, using the computer processor, by the auction application, recorded entries and responses to the forward-only process in the network-based auction service to move the forward-only process forward from the beginning until a saved milestone in the forward-only process closest to the failure;

resuming, using the computer processor the forward-only process in the network-based auction service from the saved milestone closest to the failure;

resuming, using the computer processor, the forward only process in the network-based auction service from the saved milestone closest to failure, and providing, using the computer processor, access to the resumed forward-only process in the network-based auction service to the user.

2. The method of claim 1, wherein at least one roll-back period corresponds to a defined discrete process transaction through an auction process.

3. The method of claim 2, wherein the at least one roll-back period comprises at least one of a reservation creation, a publishing operation, a receiving of a winner notification, a linking of a winner information to a backend, and an order creation operation.

4. A non-transitory computer readable storage medium including instructions adapted to execute a method using an automatic failure recovery transaction for failure recovery, the method comprising:

providing a network-based auction service, the network-based auction having a forward-only process that prevents a roll-back to a process state at a time of a failure and allows forward-only screen prompts;

providing a business information management system that contains product to be listed in auctions on the network-based auction service;

providing an auction application separate from the network-based auction service, the auction application to integrate the network-based auction service and the business information management system and to provide the automatic failure recovery transaction for the forward-only process of the network-based auction service;

defining a plurality of milestones in the automatic failure recovery transaction of the auction application, wherein each milestone is a point in the forward-only process that transaction state information is saved;

providing, by the network-based auction service, access to the forward-only process to a user;

saving entries and responses made by the user, by the auction application, upon completion of each milestone as part of the transaction state information;

after a failure occurs within the forward-only process of the network-based auction service, automatically conducting a roll-back to a beginning of the forward-only process by the auction application;

automatically inputting, by the auction application, recorded entries and responses to the forward-only process in the network-based auction service to move the forward-only process forward from the beginning until a saved milestone in the forward-only process closest to the failure;

resuming the forward-only process in the network-based auction service from the saved milestone closest to the failure; and providing access to the resumed forward-only process in the network-based auction service to the user.

5. The method of claim 1, wherein the auction application implements a recovery manager to manage the automatic failure recovery transaction, and the recovery manager models the forward-only process as a series of steps by each milestone and tracks how far the forward-only process has successfully executed.

6. The method of claim 5, wherein the recovery manager tracks entries and responses for the forward-only process by maintaining a state holder.

7. The method of claim 6, wherein the recovery manager incorporates a milestone for each step and the state holder is updated upon completion of each milestone.

8. The non-transitory computer readable storage medium of claim 4, wherein auction application implements a recovery manager to manage the automatic failure recovery transaction, and the recovery manager models the forward-only process as a series of steps by each milestone and tracks how far the forward-only process has successfully executed.

9. The non-transitory computer readable storage medium of claim 8, wherein the recovery manager tracks entries and responses for the forward-only process by maintaining a state holder.

10. The non-transitory computer readable storage medium of claim 9, wherein the recovery manager incorporates a milestone for each step and the state holder is updated upon completion of each milestone.

11. The non-transitory computer readable storage medium of claim 4, wherein at least one roll-back period corresponds to a defined discrete process transaction through an auction process.

12. The non-transitory computer readable storage medium of claim 11, wherein the at least one roll-back period comprises at least one of a reservation creation, a publishing operation, a receiving of a winner notification, a linking of a winner information to a backend, and an order creation operation.

13. The method of claim 1, wherein the auction application acts as a bridge to link the network-based auction service to the business information management system, the network-based auction service provides web auction services to users and the business information management system acts as a backend system.

14. The method of claim 1, wherein the transaction state information is saved to a database of the auction application at each milestone.

15. The non-transitory computer readable storage medium of claim 4, wherein the auction application acts as a bridge to link the network-based auction service to the business information management system, the network-based auction service provides web auction services to users and the business information management system acts as a backend system.

16. The non-transitory computer readable storage medium of claim 4, wherein the transaction state information is saved to a database of the auction.

* * * * *